(12) United States Patent
Laaksonen et al.

(10) Patent No.: US 11,076,253 B2
(45) Date of Patent: Jul. 27, 2021

(54) APPARATUS AND ASSOCIATED METHODS FOR PRESENTATION OF A BIRD'S EYE VIEW

(71) Applicant: Nokia Technologies Oy, Espoo (FI)

(72) Inventors: Lasse Laaksonen, Tampere (FI); Miikka Vilermo, Siuro (FI); Mikko Tammi, Tampere (FI); Arto Lehtiniemi, Lempaala (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 16/754,004

(22) PCT Filed: Oct. 5, 2018

(86) PCT No.: PCT/EP2018/077067
§ 371 (c)(1),
(2) Date: Apr. 6, 2020

(87) PCT Pub. No.: WO2019/072691
PCT Pub. Date: Apr. 18, 2019

(65) Prior Publication Data
US 2020/0267492 A1     Aug. 20, 2020

(30) Foreign Application Priority Data
Oct. 10, 2017    (EP) .................................... 17195576

(51) Int. Cl.
*H04S 7/00*      (2006.01)
*H04R 5/04*      (2006.01)

(52) U.S. Cl.
CPC .............. *H04S 7/302* (2013.01); *H04R 5/04* (2013.01); *H04S 2420/01* (2013.01)

(58) Field of Classification Search
CPC ...... H04S 7/302; H04S 7/304; H04S 2420/01; H04S 1/002; H04S 1/005; H04S 1/007;
(Continued)

(56) References Cited

U.S. PATENT DOCUMENTS 6,330,486 B1    12/2001  Padula
7,048,632 B2 *   5/2006  Kojima .................. A63F 13/10
                                                            463/32
(Continued)

FOREIGN PATENT DOCUMENTS

WO        2009/128859 A1    10/2009

OTHER PUBLICATIONS

"Sony's 'Joshua Bell VR Experience' on PSVR is Among the Best VR Video You'll Find on Any Headset", Road Tovr, Retrieved on Mar. 13, 2020, Webpage available at : https://www.roadtovr.com/now-psvr-sonys-joshua-bell-vr-experience-among-best-vr-video-youll-find-headset/.

(Continued)

*Primary Examiner* — Ahmad F. Matar
*Assistant Examiner* — Sabrina Diaz
(74) *Attorney, Agent, or Firm* — Alston & Bird LLP

(57) ABSTRACT

An apparatus configured, based on virtual reality content for viewing in virtual reality, the virtual reality content comprising visual content for display in a three dimensional virtual reality space and spatial audio content comprising audio for presentation such that it is audibly perceived to originate from one or more particular directions in the virtual reality space corresponding to one or more points or regions in the visual content, the virtual reality content defining at least a ground level of said virtual reality space; and based on display of a birds-eye view of the virtual reality space to a user comprising a view of the visual content substantially downward towards said ground level from a (Continued)

point of view location in said virtual reality space elevated from said ground level; to provide for presentation of said spatial audio content with a spatial audio modification, the spatial audio modification configured to modify the one or more particular directions from which the user perceives the spatial audio as being heard in an upward direction relative to said ground level at least for spatial audio content having a particular direction that is outside a field of view of said birds-eye view.

20 Claims, 13 Drawing Sheets

(58) Field of Classification Search
CPC .......... H04S 5/00; H04S 3/00; H04S 2400/01; H04R 5/04; H04R 5/02; H04R 5/033; H04R 2205/022; H04R 3/12; H04R 2499/15; H04N 5/642; G06F 1/1605
USPC .......................... 381/17, 300, 306, 309, 310
See application file for complete search history.

(56) References Cited

U.S. PATENT DOCUMENTS

| | | | | |
|---|---|---|---|---|
| 9,041,741 | B2* | 5/2015 | Mabbutt | G06F 3/012 345/633 |
| 9,268,406 | B2* | 2/2016 | Geisner | G02B 27/017 |
| 10,235,010 | B2* | 3/2019 | Funakoshi | H04S 7/30 |
| 2009/0005961 | A1* | 1/2009 | Grabowski | G02B 27/01 701/532 |
| 2010/0001993 | A1* | 1/2010 | Finn | G06F 3/04815 345/419 |
| 2010/0265399 | A1* | 10/2010 | Inoue | H04S 3/002 348/500 |
| 2011/0283865 | A1* | 11/2011 | Collins | G06F 3/04817 84/464 R |
| 2015/0297949 | A1* | 10/2015 | Aman | G06T 7/246 348/157 |
| 2018/0014135 | A1* | 1/2018 | Chung | H04S 3/008 |
| 2018/0109900 | A1* | 4/2018 | Lyren | H04S 7/304 |

OTHER PUBLICATIONS

Extended European Search Report received for corresponding European Patent Application No. 17195576.8, dated Mar. 28, 2018, 10 pages.
Pike et al., "Object-Based Spatial Audio Production for Virtual Reality Using the Audio Definition Model", AES International Conference on Audio for Virtual and Augmented, 2016, 7 pages.
Suarez et al., "A Comparison Between Measured and Modelled Head-Related Transfer Functions for an Enhancement of Real-Time 3D Audio Processing for Virtual Reality Environments", IEEE 3rd VR Workshop on Sonic Interactions for Virtual Environments (SIVE), Mar. 19, 2017, 9 pages.
International Search Report and Written Opinion received for corresponding Patent Cooperation Treaty Application No. PCT/EP2018/077067, dated Dec. 17, 2018, 13 pages.
Office Action for corresponding European Patent Application No. 17195576.8 dated Jan. 22, 2021, 8 pages.

* cited by examiner

1900 based on virtual reality content for viewing in virtual reality, the virtual reality content comprising visual content for display in a three dimensional virtual reality space and spatial audio content comprising audio for presentation such that it is audibly perceived to originate from one or more particular directions in the virtual reality space corresponding to one or more points or regions in the visual imagery, the virtual reality content defining at least a ground level of said virtual reality space; and based on display of a birds-eye view of the virtual reality space to a user comprising a view of the visual imagery substantially downward toward said ground level from a point of view location in said virtual reality space elevated from a ground location at said ground level,

1901 provide for presentation of said spatial audio content with a spatial audio modification, the spatial audio modification configured to modify the particular direction from which the user perceives the spatial audio as being heard in an upward direction relative to said ground level away from the ground location at least for spatial audio content having a particular direction that is outside a field of view of said birds-eye view.

Figure 19

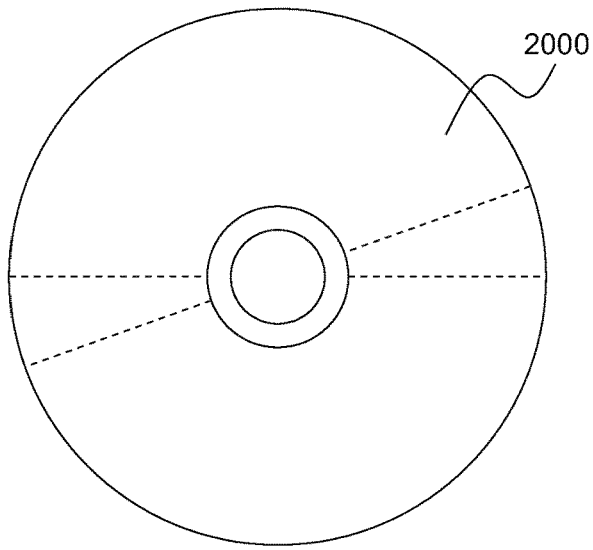

Figure 20

APPARATUS AND ASSOCIATED METHODS FOR PRESENTATION OF A BIRD'S EYE VIEW

RELATED APPLICATION

This application claims priority to PCT Application No. PCT/EP2018/077067, filed on Oct. 5, 2018, which claims priority to EP Application No. 17195576.8, filed on Oct. 10, 2017, each of which is incorporated herein by reference in its entirety.

TECHNICAL FIELD

The present disclosure relates to the field of virtual reality and, in particular, to the field of spatial audio presentation when providing bird's eye view.

BACKGROUND

The size of virtual reality content and the spaces they define is growing as content producers capture and generate richer and larger virtual worlds for a user to explore. As the virtual reality spaces grow they may become more difficult to navigate for a user. Ensuring such virtual reality spaces are easy and intuitive to navigate is important.

The listing or discussion of a prior-published document or any background in this specification should not necessarily be taken as an acknowledgement that the document or background is part of the state of the art or is common general knowledge. One or more aspects/examples of the present disclosure may or may not address one or more of the background issues.

SUMMARY

In a first example aspect there is provided an apparatus comprising:
  at least one processor; and
  at least one memory including computer program code,
  the at least one memory and the computer program code configured to, with the at least one processor, cause the apparatus to perform at least the following:
  based on virtual reality content for viewing in virtual reality, the virtual reality content comprising visual content for display in a three dimensional virtual reality space and spatial audio content comprising spatial audio for presentation such that it is audibly perceived to originate from one or more particular directions in the virtual reality space corresponding to one or more points or regions in the visual content relative to a point of view location, the virtual reality content defining at least a ground level of said virtual reality space; and
  based on display of a bird's-eye view of the virtual reality space to a user comprising a view of the visual content downward towards said ground level from the point of view location in said virtual reality space that is elevated from said ground level;
  provide for presentation of said spatial audio content with a spatial audio modification, the spatial audio modification configured to modify the one or more particular directions from which the user perceives the spatial audio as being heard in an upward direction relative to said ground level at least for the spatial audio content having a particular direction that is outside a field of view of said birds-eye view.

In one or more examples, the spatial audio modification may only be applied when the point of view location is elevated above the ground level by more than a threshold amount. In one or more examples, the spatial audio modification may only be applied when the view from the elevated point of view location is within an angular threshold of directly downwards towards said ground level. In one or more examples, the spatial audio content has a default direction from which it is heard, which may correspond to said points or regions in the visual imagery, and when the spatial audio modification is not applied, the spatial audio content is heard from said default direction.

In one or more embodiments, the spatial audio content is defined by one or more spatial audio objects, each spatial audio object having an audio track associated therewith and a spatial audio object location in the virtual reality space, the spatial audio object location comprising said location of the one of the point or region and comprising the location from which the audio track is perceived to originate when presented to the user relative to the point of view location of the user in the virtual reality space, the spatial audio modification configured to modify the spatial audio objects by providing for elevation of each of the spatial audio object locations from the ground level to thereby provide the modification of the particular direction from which the user perceives the audio of the audio track of the or each spatial audio object as being heard in an upward direction relative to said ground level.

Accordingly, in one or more examples, the spatial audio object location is modified away from its corresponding point or region in the visual content should the point or region in the visual content be visible in the bird's-eye view. In one or more examples, the spatial audio object locations are modified, by the spatial audio modification, in terms of their position in a plane aligned at the ground level in addition to the elevation.

In one or more embodiments, the spatial audio modification is configured to provide for elevation of one or more of or each of the spatial audio object locations from the ground level to elevated spatial audio object locations as a function of a distance of the spatial audio object location from the bird's eye view.

In one or more examples, the spatial audio modification is also a function of the elevation of the point of view location.

In one or more examples, the spatial audio modification is also a function of one or more of a roll and pitch and yaw of the bird's eye view. In one or more examples, based on one or more of roll and pitch in the bird's eye view, the change in direction provided by the spatial audio modification is reduced at least for spatial audio content having a particular direction that is within the field of view of said birds-eye view by virtue of the one or both of a roll and pitch of the bird's eye view.

In one or more examples, the function is configured to elevate the spatial audio object locations to corresponding elevated spatial audio object locations, the elevated spatial audio object locations more elevated the greater the distance of the spatial audio object location from the bird's eye view.

In one or more examples, the distance may be measured between the respective spatial audio object location and one or more of i) the point of view location, ii) the ground location, iii) a centre of the field of view at the ground level, iv) an edge of the field of view, or v) any other location falling within the field of view of the bird's eye view in the virtual reality space.

In one or more embodiments, the function is configured to elevate the spatial audio object locations to corresponding elevated spatial audio object locations, the elevated spatial audio object locations having no more than a maximum elevation threshold, the maximum elevation threshold based on the elevation of the point of view location.

In one or more embodiments, the spatial audio modification is applied only to spatial audio objects having spatial audio object locations within a threshold distance of the ground level.

In one or more examples, spatial audio objects not arranged within the threshold distance of the ground level may also be modified but perhaps with a different spatial audio modification.

In one or more examples, spatial audio objects having a spatial audio location above said threshold distance of the ground level may not be modified by the spatial audio modification.

In one or more embodiments, the spatial audio modification is further configured to modify the volume at which the audio track of each spatial audio object is presented to the user.

In one or more examples, the spatial audio modification is configured to modify the volume at which the audio track of each modified spatial audio object is presented to the user as a function of a distance between the any one of the ground location, the point of view location or any location based thereon and any one of the modified or unmodified spatial audio object location.

In one or more embodiments, the presentation of said spatial audio content with the spatial audio modification is conditional on the elevation of the point of view location being above a first elevation threshold.

In one or more examples, a second elevation threshold is provided at an elevation between the ground location and the first elevation threshold, and wherein when a bird's eye view is provided having an elevation between the second and the first elevation thresholds, the effect of the spatial audio modification is reduced relative to when applied above the first elevation threshold. In one or more examples, based on the user being provided with a bird's eye view having an elevation less than the second elevation threshold, the apparatus is caused not to apply the spatial audio modification.

In one or more embodiments, when the elevation of the point of view location is below an in-view-modification threshold, the spatial audio modification is only applied to spatial audio content having a particular direction that is outside the field of view of said birds-eye view; and
    when the elevation of the point of view location is above the in-view-modification threshold, the spatial audio modification is applied to spatial audio content having a particular direction that is within and outside the field of view of said birds-eye view.

In one or more embodiments, based on movement of the bird's eye view to a different field of view and thereby include, at least in part, a different part of the visual content, the apparatus is caused to provide for removal of the spatial audio modification at least for spatial audio content having a particular direction that is within the different field of view of said birds-eye view.

In one or more embodiments, the application of the spatial audio modification to spatial audio objects is dependent on a category assigned to said spatial audio objects.

In one or more examples, the category defines whether or not the user is within a predetermined interaction distance of the spatial audio object or the point or region of visual content associated therewith.

In one or more embodiments, based on one or both of a change in elevation of the bird's eye view and a change from a view provided substantially at the ground level to a bird's eye view at a higher elevation, provide for gradual application of the spatial audio modification over a gradual-application time greater than the time to complete the change.

In one or more examples, the provision of the gradual application of the spatial audio modification is conditional on the change in elevation or the change in view occurring above a threshold rate.

In one or more embodiments, the virtual reality content comprises six degrees of freedom virtual reality content in which the user is free to change the viewing location in the virtual reality space as well as their viewing direction in the virtual reality space. In one or more embodiments, the virtual reality content and the spatial audio content comprises captured real-world content.

In a further aspect there is provided a method, the method comprising:
    based on virtual reality content for viewing in virtual reality, the virtual reality content comprising visual content for display in a three dimensional virtual reality space and spatial audio content comprising spatial audio for presentation such that it is audibly perceived to originate from one or more particular directions in the virtual reality space corresponding to one or more points or regions in the visual content relative to a point of view location, the virtual reality content defining at least a ground level of said virtual reality space; and
    based on display of a bird's-eye view of the virtual reality space to a user comprising a view of the visual content downward towards said ground level from the point of view location in said virtual reality space that is elevated from said ground level;
    providing for presentation of said spatial audio content with a spatial audio modification, the spatial audio modification configured to modify the one or more particular directions from which the user perceives the spatial audio as being heard in an upward direction relative to said ground level at least for the spatial audio content having a particular direction that is outside a field of view of said birds-eye view.

In a further aspect there is provided a computer readable medium comprising computer program code stored thereon, the computer readable medium and computer program code being configured to, when run on at least one processor, perform the method of:
    based on virtual reality content for viewing in virtual reality, the virtual reality content comprising visual content for display in a three dimensional virtual reality space and spatial audio content comprising spatial audio for presentation such that it is audibly perceived to originate from one or more particular directions in the virtual reality space corresponding to one or more points or regions in the visual content relative to a point of view location, the virtual reality content defining at least a ground level of said virtual reality space; and
    based on display of a bird's-eye view of the virtual reality space to a user comprising a view of the visual content downward towards said ground level from the point of view location in said virtual reality space that is elevated from said ground level;
    providing for presentation of said spatial audio content with a spatial audio modification, the spatial audio modification configured to modify the one or more particular directions from which the user perceives the spatial audio as being heard in an upward direction relative to said ground level at least for the spatial audio content having a particular direction that is outside a field of view of said birds-eye view.

In a further aspect there is provided an apparatus, the apparatus comprising means configured to; based on virtual reality content for viewing in virtual reality, the virtual reality content comprising visual content for display in a three dimensional virtual reality space and spatial audio content comprising spatial audio for presentation such that it is audibly perceived to originate from one or more particular directions in the virtual reality space corresponding to one or more points or regions in the visual content relative to a point of view location, the virtual reality content defining at least a ground level of said virtual reality space; and based on display of a bird's-eye view of the virtual reality space to a user comprising a view of the visual content downward towards said ground level from the point of view location in said virtual reality space that is elevated from said ground level;

provide for presentation of said spatial audio content with a spatial audio modification, the spatial audio modification configured to modify the one or more particular directions from which the user perceives the spatial audio as being heard in an upward direction relative to said ground level at least for the spatial audio content having a particular direction that is outside a field of view of said birds-eye view.

The present disclosure includes one or more corresponding aspects, examples or features in isolation or in various combinations whether or not specifically stated (including claimed) in that combination or in isolation. Corresponding means and corresponding functional units (e.g., function enabler, spatial audio presenter, spatial audio modifier, movement tracker, display device) for performing one or more of the discussed functions are also within the present disclosure.

Corresponding computer programs for implementing one or more of the methods disclosed are also within the present disclosure and encompassed by one or more of the described examples.

The above summary is intended to be merely exemplary and non-limiting.

BRIEF DESCRIPTION OF THE FIGURES

A description is now given, by way of example only, with reference to the accompanying drawings, in which:

FIG. 19 shows a flowchart illustrating an example method; and

FIG. 20 shows a computer readable medium.

DESCRIPTION OF EXAMPLE ASPECTS

Figure 1:
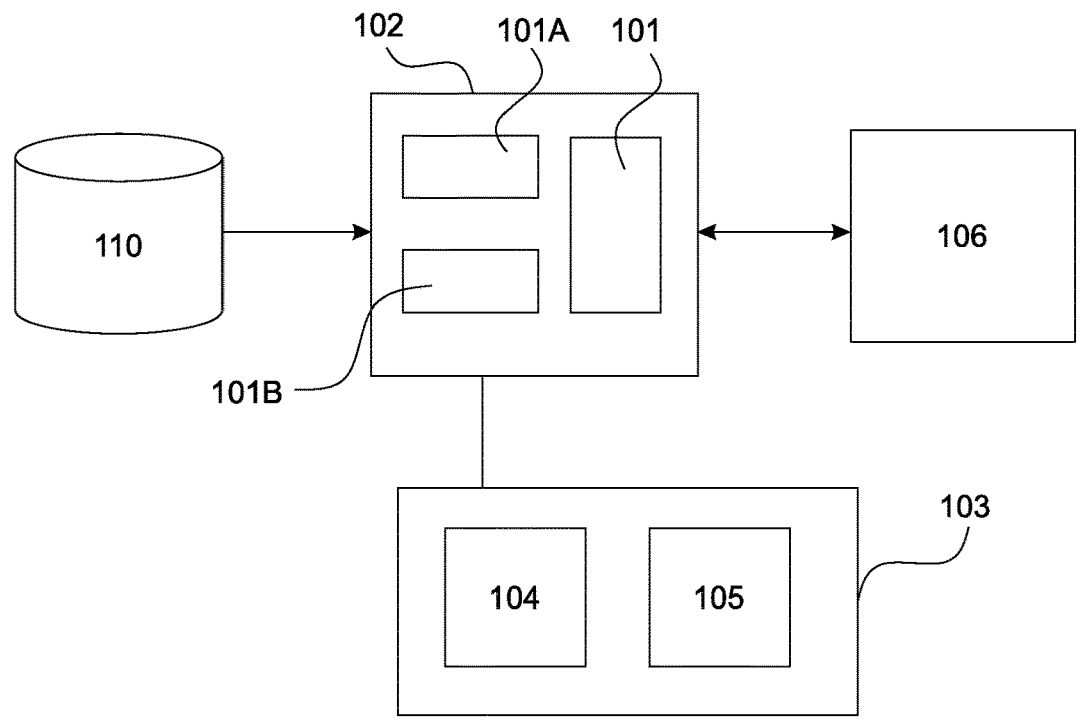
FIG. 1 illustrates an example apparatus for providing a spatial audio modification.

Virtual reality (VR) may use a VR display comprising a headset, such as glasses or goggles or virtual retinal display, or one or more display screens that surround a user to provide the user with an immersive virtual experience. A virtual reality apparatus, which may or may not include the VR display, may provide for presentation of multimedia VR content representative of a virtual reality scene to a user to simulate the user being present within the virtual reality scene. Accordingly, in one or more examples, the VR apparatus may provide signalling to a VR display for display of the VR content to a user while in one or more other examples, the VR apparatus may be part of the VR display, e.g. part of the headset. The virtual reality scene may therefore comprise the VR content displayed within a three-dimensional virtual reality space so that the user feels immersed in the scene, as if they were there, and may look around the VR space at the VR content presented around them. In one or more examples, the VR apparatus may provide signalling to speakers or headphones for presentation of VR content comprising spatial audio. The virtual reality scene may therefore comprise the VR content audibly presented so that the user feels immersed in an audio scene, as if they were there, and may look around and hear the audio presented around them. The virtual reality scene may replicate a real world scene to simulate the user being physically present at a real world location or the virtual reality scene may be computer generated or a combination of computer generated and real world multimedia content. Thus, the VR content may be considered to comprise the imagery (e.g. static or video imagery), audio and/or accompanying data from which a virtual reality scene may be generated for display. The VR apparatus may therefore provide the VR scene by generating the virtual, three-dimensional, VR space in which to display the VR content. The virtual reality scene may be provided by a panoramic video (such as a panoramic live broadcast), comprising a video having a wide or 360° field of view (or more, such as above and/or below a horizontally oriented field of view). A panoramic video may have a wide field of view in that it has a spatial extent greater than a field of view of a user or greater than a field of view with which the panoramic video is intended to be displayed.

The VR content provided to the user may comprise live or recorded images of the real world, captured by a VR content capture device, for example. An example VR content capture device comprises a Nokia Technologies OZO device. As the VR scene is typically larger than a portion a user can view with the VR display, the VR apparatus may provide, for display on the VR display, a virtual reality view of the VR scene to a user, the VR view showing only a spatial portion of the VR content that is viewable at any one time. The VR apparatus may provide for panning around of the VR view in the VR scene based on movement of a user's head and/or eyes.

The virtual reality content may comprise, and a VR apparatus presenting said VR content may provide, pre-defined-viewing-location VR or free-viewing-location VR. In predefined-viewing-location VR, the location of the user in the virtual reality space may be fixed or follow a pre-defined path. Accordingly, a user may be free to change their viewing direction with respect to the virtual reality imagery provided for display around them in the virtual reality space, but they may not be free to arbitrarily change their viewing location in the VR space to explore the VR space. Thus, the user may experience such VR content from a fixed point of view or viewing location (or a limited number of locations based on where the VR content capture devices were located in the scene). In some examples of predefined-viewing-location VR the imagery may be considered to move past them. In predefined-viewing-location VR content captured of the real world, the user may be provided with the point of view of the VR content capture device. Predefined-viewing-location VR content may provide the user with three degrees of freedom in the VR space comprising rotation of the viewing direction around any one of x, y and z axes and may therefore be known as three degrees of freedom VR (3DoF VR).

In free-viewing-location VR, the VR content and VR apparatus presenting said VR content may enable a user to be free to explore the virtual reality space. Thus, the user may be provided with a free point of view or viewing location in the virtual reality space. Free-viewing-location VR is also known as six degrees of freedom (6DoF) VR or volumetric VR to those skilled in the art. Thus, in 6DoF VR the user may be free to look in different directions around the VR space by modification of their viewing direction and also free to change their viewing location (their virtual location) in the VR space by translation along any one of x, y and z axes. The movement available in a 6DoF virtual reality space may be divided into two categories: rotational and translational movement (with three degrees of freedom each). Rotational movement enables a user to turn their head to change their viewing direction. The three rotational movements are around x-axis (roll), around y-axis (pitch), and around z-axis (yaw). Translational movement means that the user may also change their point of view in the space to view the VR space from a different virtual location, i.e., move along the x, y, and z axes according to their wishes. The translational movements may be referred to as surge (x), sway (y), and heave (z) using the terms derived from ship motions.

One or more examples described herein relate to 6DoF virtual reality content in which the user is at least substantially free to move in the virtual space either by user-input through physically moving or, for example, via a dedicated user interface (UI).

Spatial audio comprises audio presented in such a way to a user that it is perceived to originate from a particular location, as if the source of the audio was located at that particular location. Thus, virtual reality content may be provided with spatial audio having directional properties, such that the audio is perceived to originate from a point in the VR space, which may be linked to the imagery of the VR content.

The spatial positioning of the spatial audio may be provided by the degree to which audio is presented to each channel of a multichannel audio arrangement, as well as by 3D audio effects, such as those that utilise a head related transfer function to create a spatial audio space in which audio can be positioned for presentation to a user. Spatial audio may be presented by headphones by using head-related-transfer-function (HRTF) filtering techniques or, for loudspeakers, by using vector-base-amplitude panning techniques to position the perceived aural origin of the audio content. The user or the headphones may be head-tracked so that movements of the user's head can be accounted for in the presentation of the spatial audio so that the audio is heard from the appropriate directions.

The spatial audio content may define an aural scene that defines the spatial, three-dimensional arrangement of audio in a scene, which is presentable to recreate the three-dimensional audible experience of being in that scene. Thus, the aural scene may be considered representative of a three-dimensional audio environment in which audio is perceived to be heard from different directions in the three-dimensional audio environment as defined by the spatial audio content.

Spatial audio content may be represented in many different ways. In one or more examples, the spatial audio content may be considered to define an aural scene defined by spatial audio objects that have an associated three-dimensional position in the virtual reality space. The audio objects may represent audio sources in the scene that have been captured or may be computer generated sources of audio. A spatial audio object may comprise an object that serves as a source of spatial audio in the virtual reality space. Accordingly, when presented to a user, the position of the spatial audio objects is used to render the spatial audio content associated with each object such that the user perceives the arrangement of the audio objects in the aural scene. In one or more other examples, the spatial audio may be considered to comprise an aural scene encoded using ambisonic processing techniques. Ambisonic processing may not define specific directions from which the audio is heard, but may be captured such that information representing the three-dimensional positioning of the audio is captured in the way the audio is captured. For example, ambisonic audio capture is done using an 'ambisonic microphone' comprising a number of microphone capsules. In a first order ambisonic case, the microphone is used to capture four signals W (omni-directional), X, Y and Z. During playback through a loudspeaker array for example, the signal rendered from each loudspeaker is a linear combination of the above signals which can recreate the aural scene.

In one or more other examples, the captured spatial audio may be considered to comprise an aural scene defined by way of spatial audio coding. For example, the audio of a scene is recorded with a microphone array. For every predetermined time frame (10 ms, for example) the microphone signals are split into frequency bands. For each frequency band a direction is determined (i.e. the direction of the sound at this frequency band). Accordingly, the audio is associated with directional information based on the spatial audio coding. During rendering the audio corresponding to the different frequencies may be played from the determined directions using vector base amplitude panning (VBAP), for example.

In one or more examples, the spatial audio content may be considered to include information representing the directions towards/locations of the audio sources from a point of view location or "listening position" or information that provides for determination of the directions towards/locations of the audio sources.

By whichever technique the spatial audio content is represented, it may be presented such that a user may hear different audio perceived from different directions in the virtual reality space.

As virtual reality spaces increase in size, navigating around said spaces, particularly in 6DoF virtual reality, can be challenging. In one or more examples, the virtual reality space includes a ground level, similar to a real-world ground level. The ground level may comprise a plane, or one or more interconnected planes, in the three-dimensional virtual reality space configured to provide a default level for the user to explore the virtual reality space. If a plurality of interconnected planes are provided, they may be at angles to one another to simulate hills or inclines, or the planes may be at different levels to simulate floors in a building. In one or more embodiments, the ground level provides a reference plane from which to measure elevation in the virtual reality space. A user may be given a point of view location in said virtual reality space substantially at said ground level. Accordingly, a VR apparatus may provide the user with a virtual reality view of the virtual reality space at a height above the ground level to replicate the user standing in said virtual reality space. In at least some examples, this height may depend on the user's height giving a more natural, personalized spatial audio (and visual) percept for the user. The audio of the spatial audio may be heard from one or more of a plurality of directions but may specifically be provided from directions substantially in a plane corresponding to ground level. Accordingly, for many instances of VR content, the spatial audio content may be heard from directions in said plane which may appear to the user as being in front, behind and to the left and right of them and directions in between.

In one or more examples, it may be advantageous to switch to bird's eye view of the virtual reality space to view the visual content from above, which may assist in navigating the space or providing a visual overview of the virtual reality content in the space.

While a bird's eye view may be visually useful, the presentation of spatial audio, at least for spatial audio where the source of the audio is perceived to originate from ground level, may be less useful. The bird's eye view may be provided by providing the user with a virtual reality view of the virtual reality space from an elevated point of view location, downward towards the ground level. From this elevated point of view location, some or all of the spatial audio (that has its source substantially located at ground level) may be heard from a direction in front of the user, i.e. from the ground level which, as the virtual reality view is provided looking substantially downward, is presented in front of the user. It will be appreciated that the immersive quality of spatial audio may be lost when providing a bird's eye view. It will also be appreciated that the ability for a user to audibly identify the direction towards a source of audio is hampered when providing a bird's eye view because much of the audio will be heard from substantially the same direction—in front of the user given the downward directed virtual reality view towards the ground level.

With reference to the example of FIG. 1, we disclose an apparatus 101 configured to receive virtual reality content, such as from a content store 110. The virtual reality content may comprise visual content and spatial audio content. The virtual reality content may also include ambient audio content comprising audio that is not heard from a specific direction. The virtual reality content when rendered by a virtual reality apparatus 102 and provided for viewing in virtual reality may provide visual content for display in a three-dimensional virtual reality space and spatial audio content comprising audio for presentation such that it is audibly perceived to originate from one or more particular directions in the virtual reality space. The one or more particular directions of the spatial audio content may correspond to one or more points or regions in the visual imagery. Accordingly, a user presented with said virtual reality content may perceive the spatial audio as originating from the particular point or region of the visual content. The virtual reality content may define a ground level, as described above. The apparatus 101 of this example, based on display of a bird's eye view comprising a view of the visual imagery substantially downward towards said ground level from a point of view location in said virtual reality space elevated from a ground location at said ground level; is caused to provide for presentation of said spatial audio content with a spatial audio modification, the spatial audio modification configured to modify the particular direction from which the user perceives the spatial audio as being heard in an upward direction relative to said ground level at least for spatial audio content having a particular direction that is outside a field of view of said birds-eye view.

Accordingly, from the point of view location that provides the bird's eye view, the spatial audio content would normally be heard from directions towards the ground (apart from, perhaps, audio from birds or aircraft in the virtual reality space). However, the apparatus 101 provides for application of the spatial audio modification which may temporarily modify the presentation of the spatial audio so that rather than presenting the spatial audio such that it is heard from a direction corresponding to the visual imagery, the direction from which it is perceived relative to the user is modified upwards away from the ground level. Accordingly, as will be appreciated, when provided with a bird's eye view looking downward, the spatial audio that would previously be perceived as generally in front of the user at ground level, will, by virtue of the modification be perceived to be heard from directions above, below, left and right of a user relative to their downward view. Thus, put another way, the spatial audio modification widens a field of hearing from a narrow range of directions downward towards the ground level to a wider range of directions around the user. A technical effect of such a modification is to overcome the limited directions from which spatial audio (having its audio "origin" at ground level) is presented when a bird's eye view is provided, which in turn may improve the ability for a user to audibly navigate the virtual reality space. Thus, the spatial audio modification may allow for more useful user perception of the direction towards the perceived origin of spatial audio and therefore allow for more accurate user panning of the bird's eye view to locate an audible object of interest in said virtual reality content.

The apparatus 101 may comprise or be connected to a processor 101A and a memory 101B configured to execute computer program code. The apparatus 101 may have only one processor 101A and one memory 101B but it will be appreciated that other embodiments may utilise more than one processor and/or more than one memory (e.g. same or different processor/memory types). Further, the apparatus 101 may be an Application Specific Integrated Circuit (ASIC).

The processor 101A may be a general purpose processor dedicated to executing/processing information received from other components, such as from a content store 110 and the respective apparatuses 101, 106 in accordance with instructions stored in the form of computer program code in the memory. The output signalling generated by such operations of the processor is provided onwards to further components, such as to a VR apparatus 102 and/or a VR headset 103 comprising a VR display 104 and headphones 105.

The memory 101B (not necessarily a single memory unit) is a computer readable medium (solid state memory in this example, but may be other types of memory such as a hard drive, ROM, RAM, Flash or the like) that stores computer program code. This computer program code stores instructions that are executable by the processor, when the program code is run on the processor. The internal connections between the memory and the processor can be understood to, in one or more example embodiments, provide an active coupling between the processor and the memory to allow the processor to access the computer program code stored on the memory.

In this example the respective processors and memories are electrically connected to one another internally to allow for electrical communication between the respective components. In this example the components are all located proximate to one another so as to be formed together as an ASIC, in other words, so as to be integrated together as a single chip/circuit that can be installed into an electronic device. In some examples one or more or all of the components may be located separately from one another.

The apparatus 101, in this example, forms part of the virtual reality apparatus 102 for presenting the virtual reality content to a user. The apparatus 101 and the VR apparatus 102 may share the processor 101A and memory 101B. In other examples, the apparatuses 101, 102 may have different processors and/or memories. In other examples the apparatus 101 may be physically independent of the VR apparatus 102 and may be in communication therewith to provide the spatial audio modification.

The apparatus 101 and/or VR apparatus 102 may receive input signalling from a head tracker 106, which may track the orientation of a user's head and, in some examples, their physical position to provide signalling to modify the direction of view provided to the user and/or to modify their point of view location in the virtual reality space. It will be appreciated that other input means may be used to control the direction of view provided to the user or their point of view location in the virtual reality space.

Figure 2:
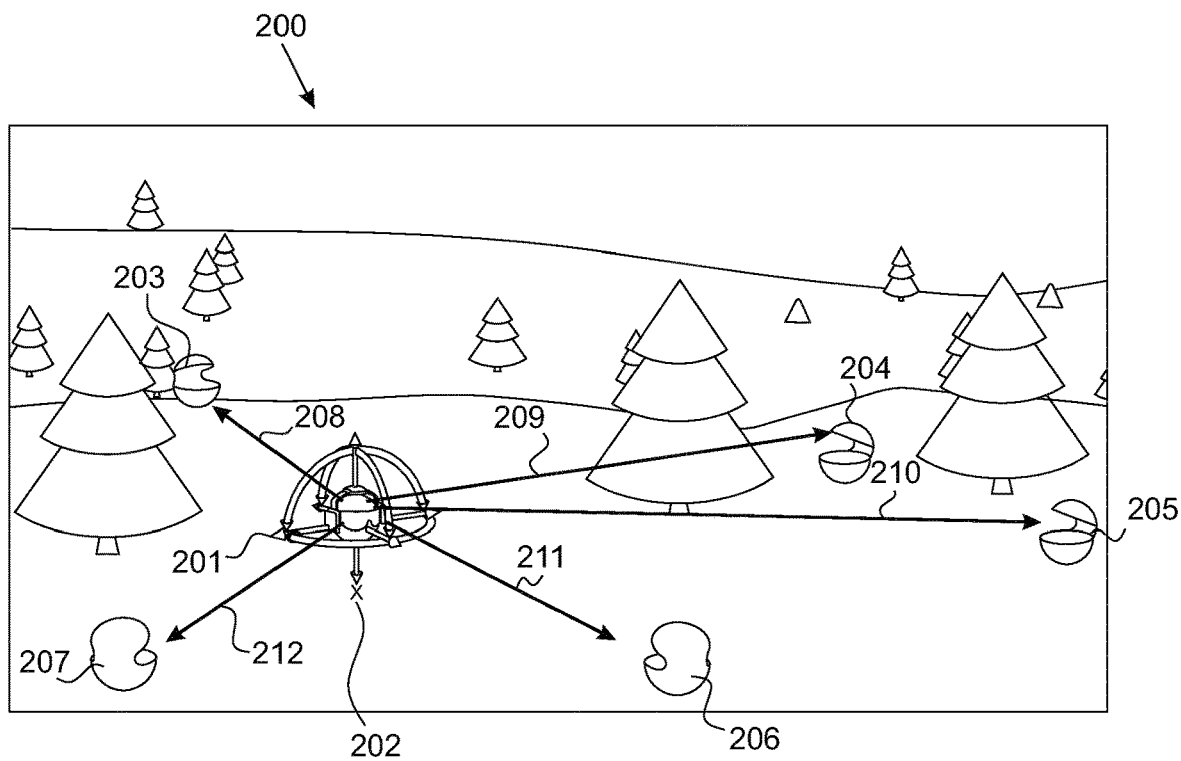
FIG. 2 shows a virtual reality space having a plurality of spatial audio objects illustrated therein.

FIG. 2 shows a view of a virtual reality space 200 with visual content rendered therein. The location of the user 201 is shown schematically by a diagram of a user's head with arrows therearound illustrating possible motion the user may make in navigating the virtual reality space. The user 201 is shown at a ground level in the virtual reality space at a ground location 202. The ground location may comprise a point at the ground level projected from the user 201 that is perpendicular to the ground level, e.g. a location directly beneath the user at the ground level. In the virtual reality space 200 a plurality of audio sources 203-207 are shown that represent the aural scene provided by the spatial audio content. The audio sources 203-207 have a location in the virtual reality space 200 that defines the direction from which the user perceives the audio therefrom.

In the examples that follow the spatial audio content may be encoded in any form, such as ambisonic audio or as spatial audio objects. However, for ease of understanding, in the description that follows the spatial audio content is described in terms of spatial audio objects that define a source location of an audio track such that the user perceives the audio of the audio track from the spatial audio object based on the relative position of the user and the position of the audio object in the virtual reality space. Thus, the audio sources 203-207 may comprise spatial audio objects. The audio of a first of the audio objects 203, as presented to the user, will be perceived by the user as from direction 208. Likewise, the audio of the second audio object 204 will be heard from direction 209, the third audio object 205 will be heard from direction 210, the fourth audio object 206 will be heard from direction 211 and the fifth audio object 207 will be heard from direction 212.

Figure 3:
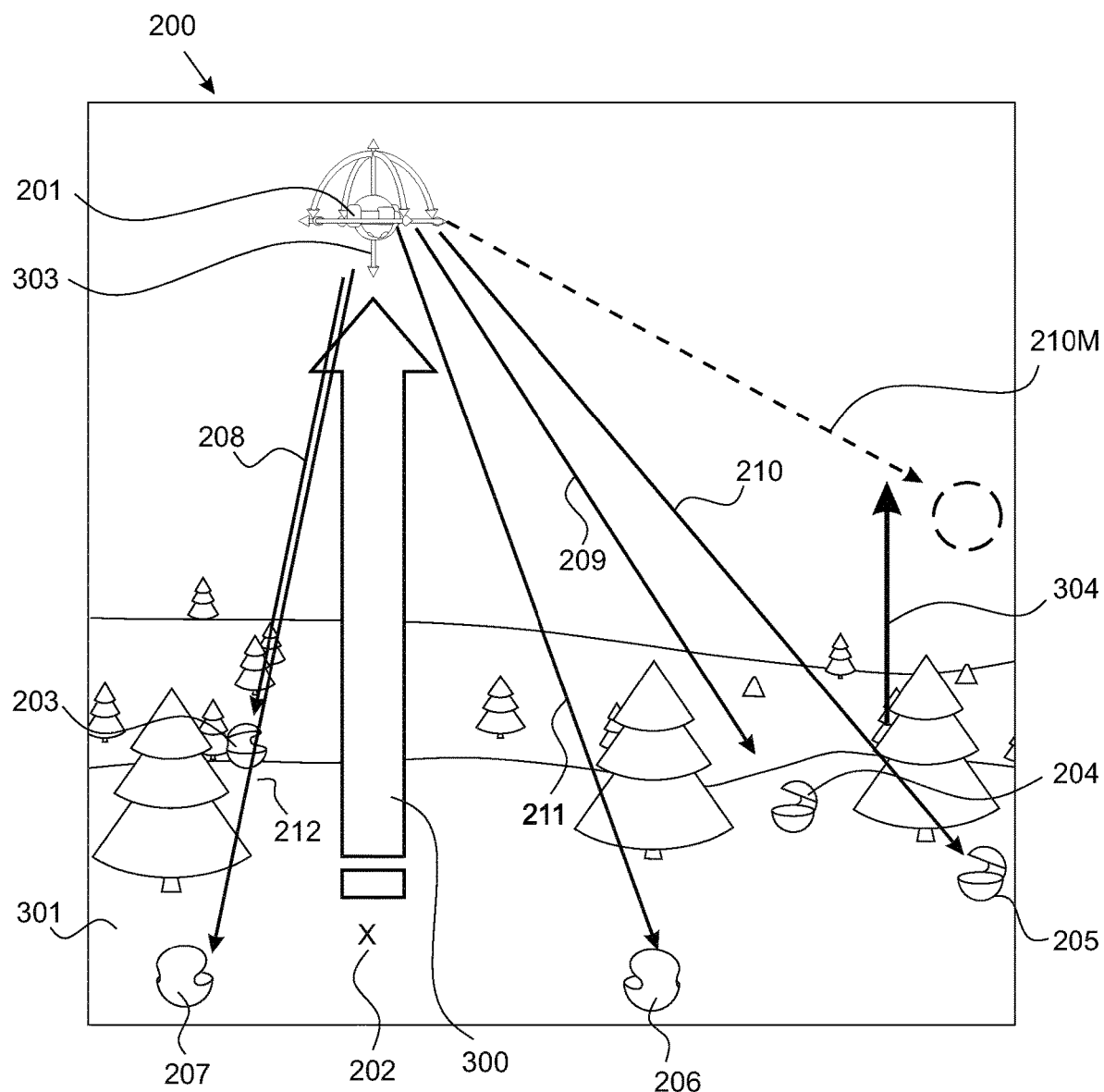
FIG. 3 shows a virtual reality space illustrating the point of view location and viewing direction provided when displaying a bird's eye view.

The example of FIG. 3 shows a view of the same virtual reality space 200 but with the user 201 having been provided with a bird's eye view. Accordingly, the user is provided with a point of view location in the virtual reality space that is elevated by distance 300 above the ground location 202 at the ground level 301. The direction of view from the point of view location is substantially downward towards the ground level 301 as illustrated by arrow 303. As illustrated, from the elevated point of view location, the directions 208 to 212 towards the audio objects 203-207 now lie in substantially the same direction that is towards the ground level.

As will be described in more detail below with reference to later figures, the spatial audio modification provides for temporary modification of the directions 208-212 in an upwards direction 304 away from the ground level 301, such that the spatial audio is heard from a different direction shown by direction 210M for audio object 205. Thus, at least when the bird's eye view of FIG. 3 is provided, the spatial audio modification may modify the direction from which the spatial audio content is perceived in an upward direction relative to the ground level. The spatial audio modification may not be applied to all spatial audio objects in the virtual reality content. For example, the audio from audio objects representing aircraft or birds that are more than a threshold distance from the ground level may not be modified. Further, the audio from audio objects that are associated with points or regions that are visible in the bird's eye view presented to a VR display of a user may not be modified by the spatial audio modification or may be modified to a lesser degree than others outside the bird's eye view.

Figure 4:
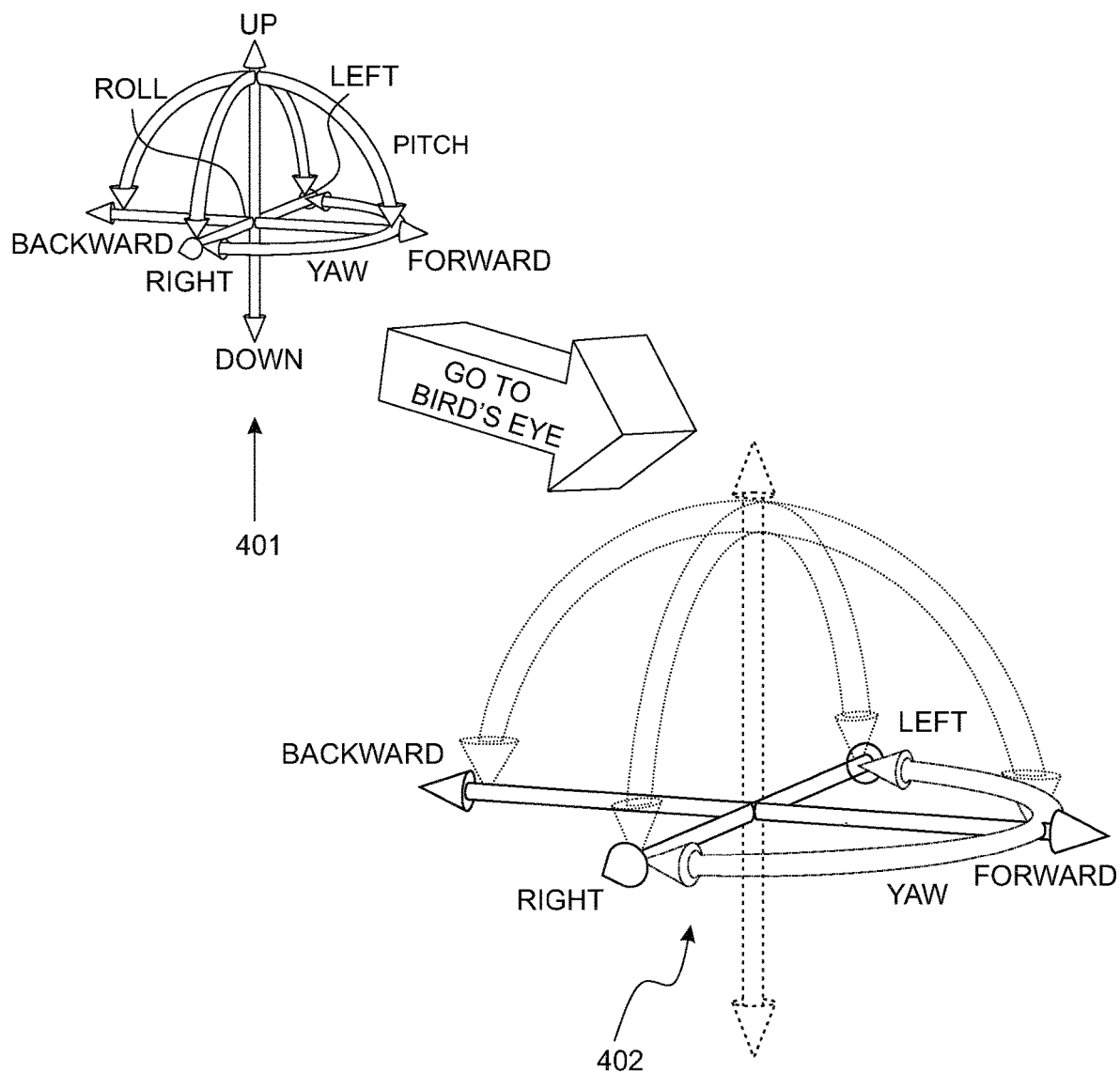
FIG. 4 shows a set of axes illustrating translational and rotational movement that may be available to a user when provided and not provided with a bird's eye view.

The example of FIG. 4 illustrates the six degrees of freedom of movement that may be available to a user when exploring a 6DoF virtual reality space. This movement may be divided into two categories: rotational and translational movement (with three degrees of freedom in each). For predefined-viewing-location VR the rotational movement may be provided such that a user may turn their head to experience the virtual reality space from a static or automatically moving point. The three rotational movements are around x-axis (roll), around y-axis (pitch), and around z-axis (yaw). For 6DoF VR the movement available to a user may additionally include translational movement which means that the user may also change their point of view location in the virtual reality space, i.e., move along the x, y, and z axes according to their wishes. The translational movements may be referred to as surge (x), sway (y), and heave (z).

The example of FIG. 4 shows the movement that may be normally available to a user at 401. For example, when the user is at ground level a full range of movement may be available. The movement available to a user when presented in a bird's eye view may, in one or more examples, be reduced. Accordingly, at 402 it is shown the range of motion available comprising translational movement at least comprising surge and sway and optionally heave. In terms of rotational movement for a bird's eye view, yaw may be available but roll and pitch may not be available. In other embodiments, all of the six degrees of freedom may be available whether the user is provided with the "normal" view or a bird's eye view. Thus, in this example, 402 may represent the degrees of freedom that have a greater influence on how the spatial audio content is presented when the spatial audio modification is applied while providing the bird's eye view.

Figure 5:
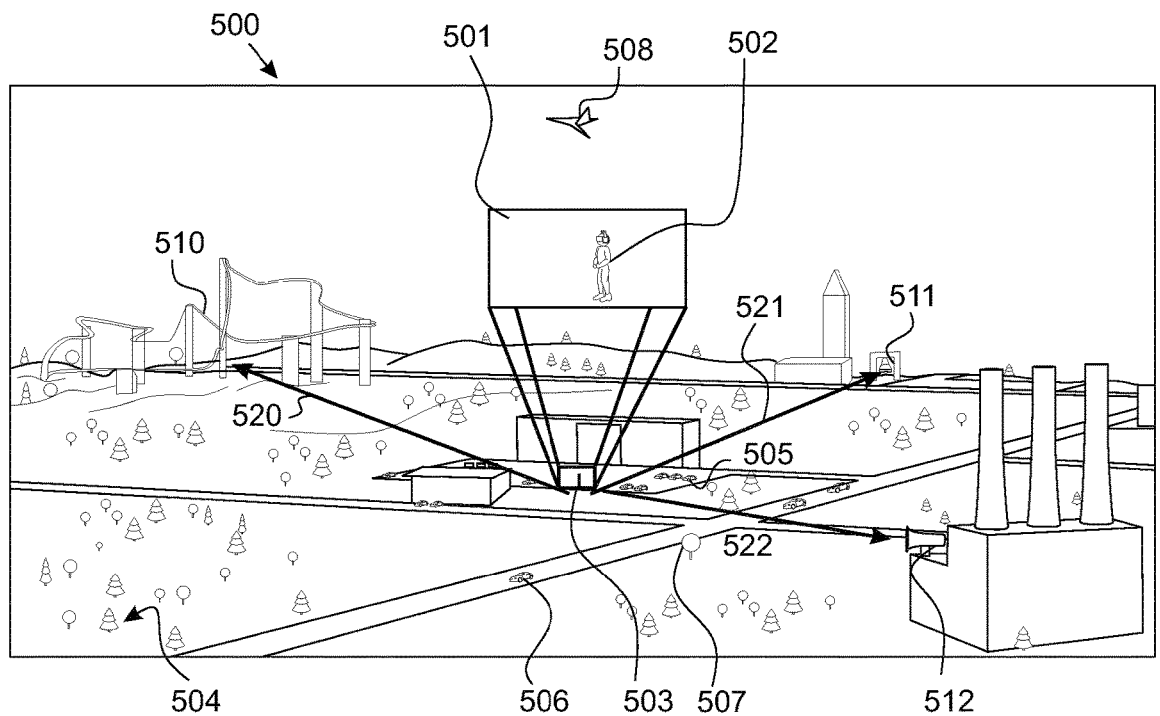
FIG. 5 shows an example virtual reality space with visual content displayed therein.

The example of FIG. 5 shows a further virtual reality space 500. A magnified section 501 is shown to illustrate the point of view location 503 of a user, shown magnified at 502, in said virtual reality space 500. Thus, the virtual reality space 500 may cover a vast area/volume that the user 502 can explore. The virtual reality space includes a ground level 504 at which the point of view location 503 is substantially located as shown in example FIG. 5.

In the example of FIG. 5, the user 502 is shown in the middle of a parking lot 505. If we consider the aural scene, the vast virtual reality space around the user features various audio objects that, in combination, create the aural scene. For example, the spatial audio content will include the cars 506 perceived from their location on the roads shown in the visual content and bird sounds perceived to originate from the trees 507 shown in the visual content. An aircraft 508 at a distance comprises a further part of the spatial audio content. Particularly, there are several audio objects of interest that correspond to visual points/regions of the visual content that the user 502 might wish to go explore. These include an amusement park 510, a church with a bell 511 in the churchyard, and a factory with a loud horn 512. The audio objects of interest and corresponding visual objects, in a large environment, may be difficult for the user to navigate to and consider his options in exploring the virtual reality space 500.

It will be appreciated that at least a subset of the spatial audio objects are located substantially at the ground level 504, namely the amusement park 510, the bell 511 and the horn 512 (as well as the birds in the trees and cars). The apparatus may compare the location of the spatial audio objects to a threshold above the ground level to identify spatial audio objects that are "substantially at said ground level". It will also be appreciated that a subset of the audio objects may be categorized as objects of interest. In one or more examples, the categorization may be provided by one or more of a) categorization information in the virtual reality content, b) the VR apparatus based on user preferences and information in the virtual reality content, such as audio object name or type or c) manual user-selection, among other examples. The spatial audio modification may be applied to only those spatial audio objects located within a threshold distance of the ground level 504 or, more generally, spatial audio that is associated with visual points or regions located within a threshold of ground level. The spatial audio modification may only be applied to spatial audio objects located having a predetermined category or, more generally, spatial audio that is associated with visual points or regions having the predetermined category.

Figure 6:
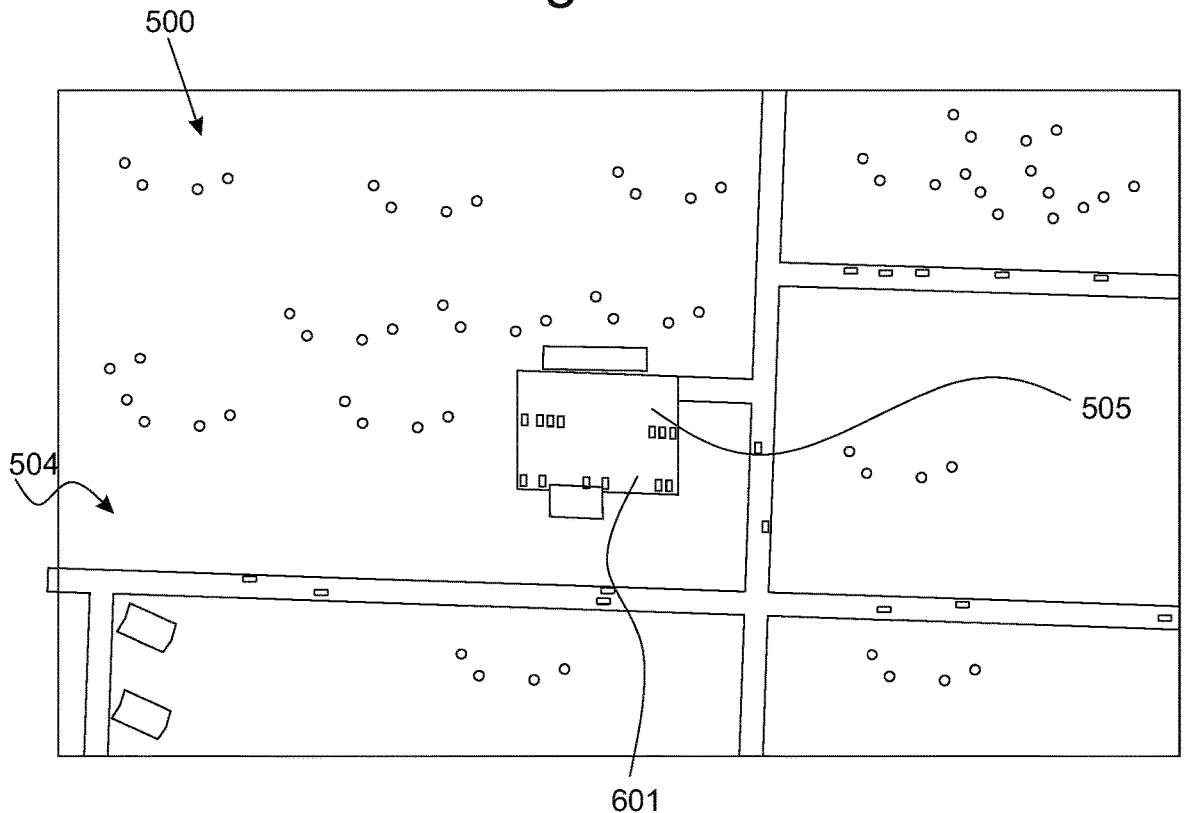
FIG. 6 shows a bird's-eye view of the virtual reality space of FIG. 5.

The example of FIG. 6 is of the same virtual reality space 500 as that shown in FIG. 5. However, FIG. 6 shows a bird's eye view from an elevated point of view location above the ground level 504. The bird's eye view, in this example, is provided based on a user-request to switch to a bird's eye view, although presentation of the bird's eye view may be initiated by the VR apparatus, such as based on received data or data in the VR content. In this example, the ground location 601, comprising the point at the ground level 504 from which the point of view location is elevated, is substantially the same as the point of view location the user had when the bird's eye view was provided. Accordingly, for the user, the switch to the bird's eye view, is experienced as if they were projected upwards, perpendicular to the ground level, to the elevated point of view location above the ground location 601. FIG. 6 shows the plan view of the parking lot 505 and the surrounding roads. As can be seen, navigating using the bird's eye view may not be easy as the points of interest, comprising the amusement park 510, the bell 511 and the horn 512 are not visible given that only a spatial portion of the virtual reality space can be displayed at any one time.

Figure 7:
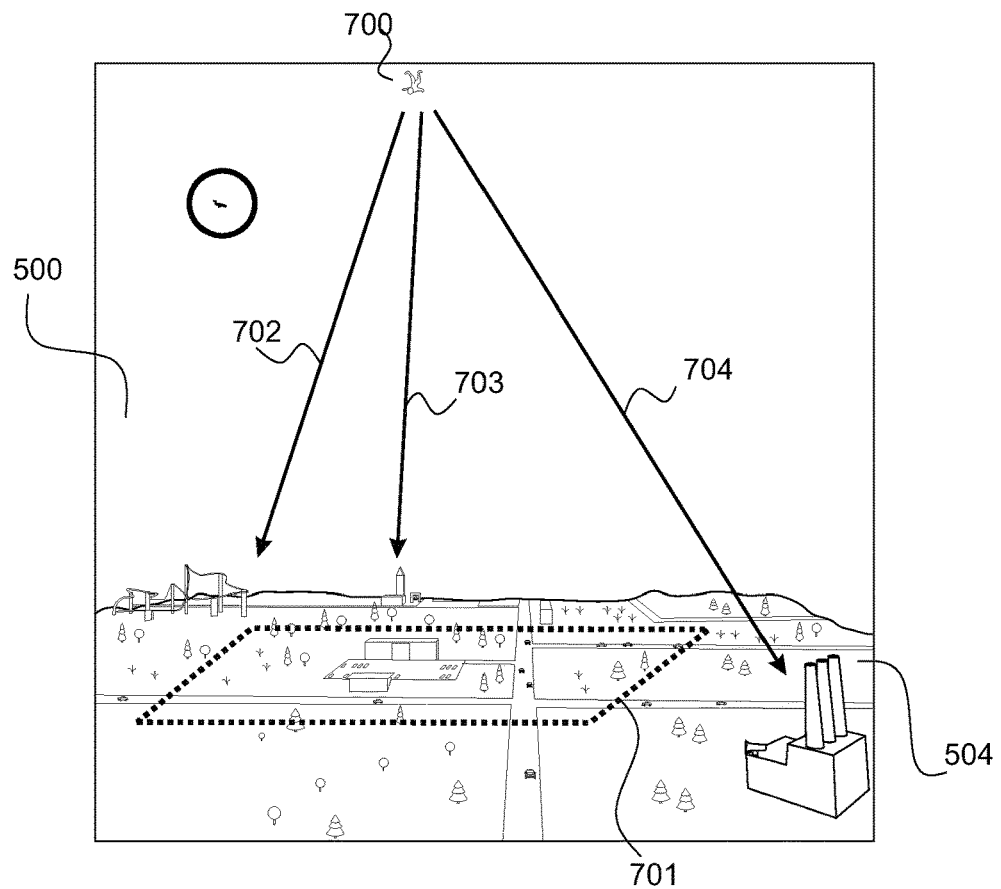
FIG. 7 shows the point of view location and the field of view in the virtual reality space when a bird's eye view is provided.

The example FIG. 7 shows a side view of the virtual reality space 500, so that the point of view location 700 from which FIG. 6 is rendered is visible. Dashed lines 701 show the boundaries of the bird's eye view shown in FIG. 6 to illustrate the extent, at ground level, of the bird's eye view. Arrows 702, 703, 704 illustrate the direction from which the user perceives the audio of the amusement park 510, the bell 511 and the horn 512 respectively without any spatial audio modification. Thus, in terms of the aural scene, the audio of the amusement park 510, the bell 511 and the horn 512 may be heard from less distinct directions as compared to the ground level as the corresponding audio objects 510, 511 and 512 are all generally in front of the user at the ground level 504.

Figure 8:
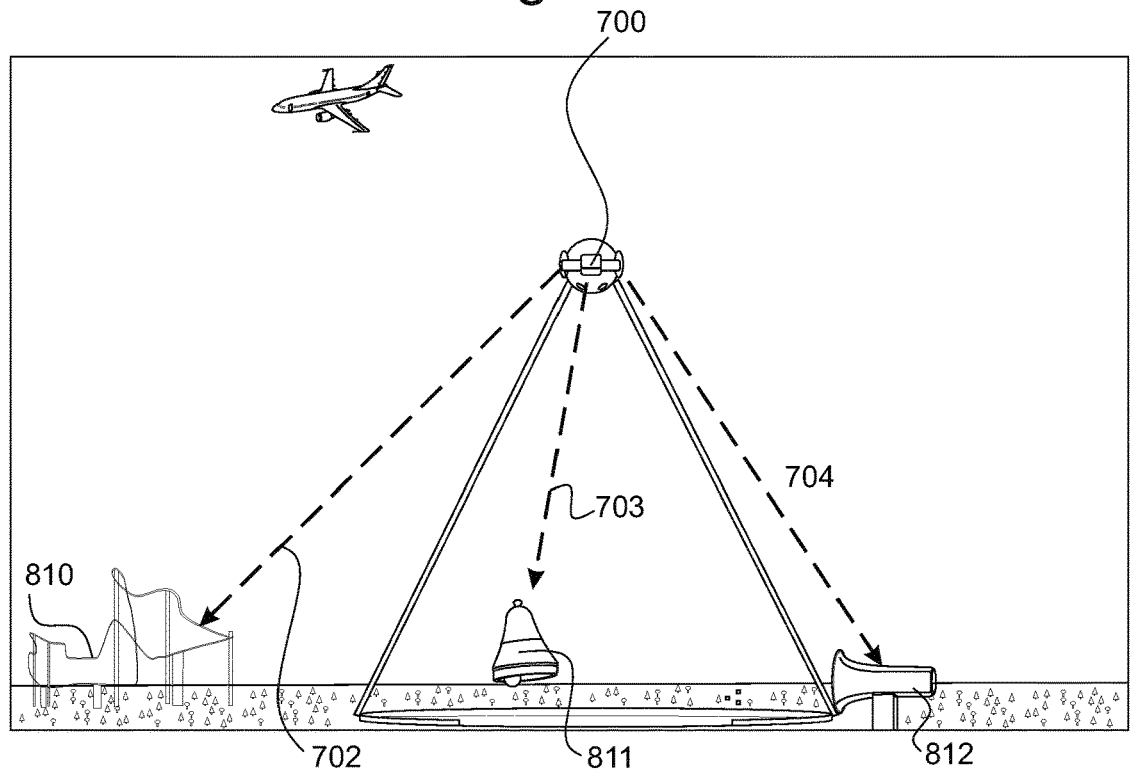
FIG. 8 shows the virtual reality space with the spatial audio objects depicted therein.
Figure 9:
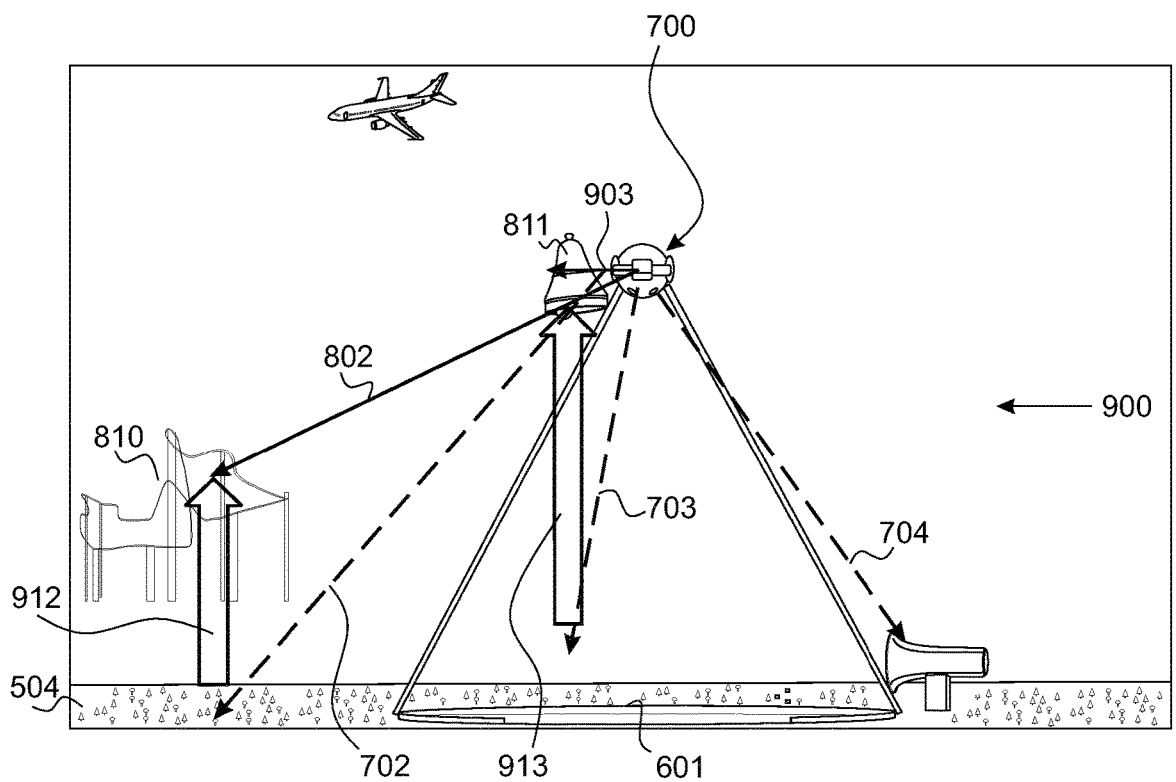
FIG. 9 shows an example of the change of the direction from which the spatial audio is perceived as originating by virtue of application of the spatial audio modification.
Figure 10:
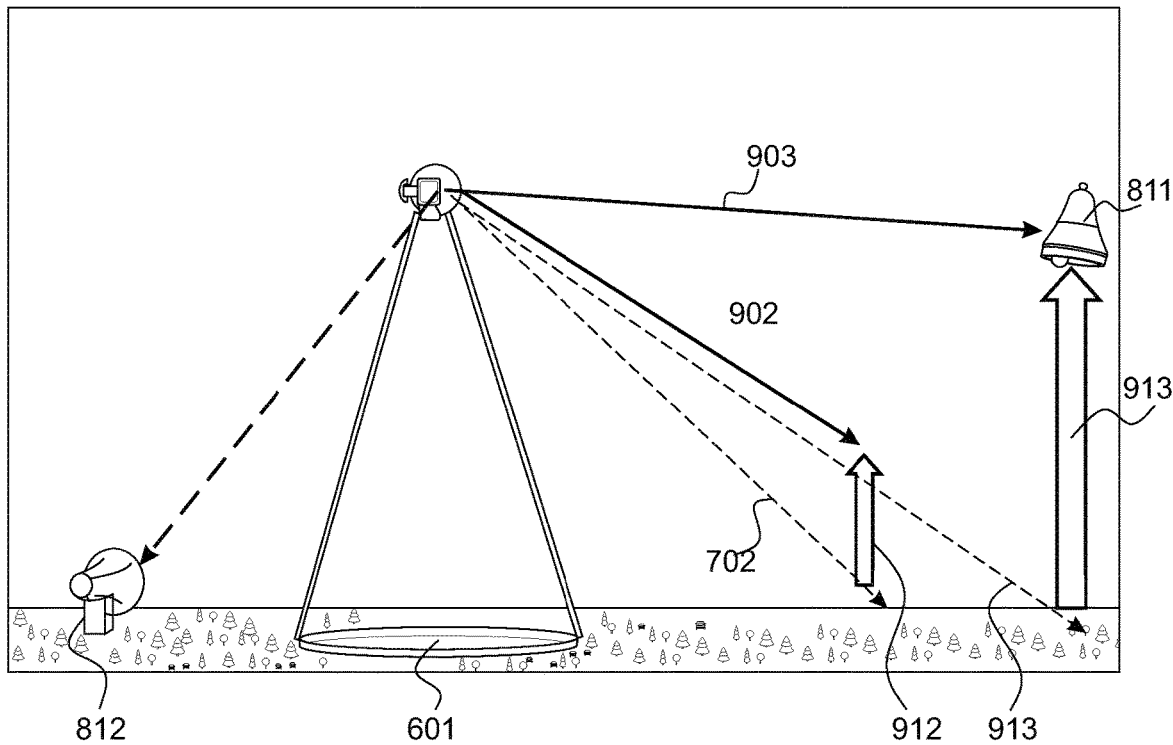
FIG. 10 shows the view of FIG. 9 rotated by 90 degrees.

The example FIGS. 8, 9 and 10 illustrate the effect of the spatial audio modification. FIG. 8 shows a further side view of the virtual reality space 500 in which the audio objects are depicted as an amusement park 810, a bell 811 and a horn 812. In FIG. 8 the spatial audio modification is not applied and the direction to the audio objects are illustrated by the arrows 702, 703, 704.

FIG. 9 shows the same view as view FIG. 8. FIG. 10 shows a view from direction 900, illustrated in FIG. 9.

FIG. 9 shows the direction from which the user perceives the spatial audio of the bell 811 modified from direction 703 to direction 903 by the spatial audio modification. The direction from which the user perceives the spatial audio of the amusement part 810 is modified by the spatial audio modification from direction 702 to direction 902. Accordingly, the directions 703 and 702 have been modified in an upward direction, shown by arrows 912 and 913 relative to said ground level 504 away from the ground location 601.

The change in direction from which the user perceives the spatial audio as being heard may be achieved by applying an ambisonic audio processing function to spatial audio content of ambisonic type to achieve the upward change in direction. In other examples, the spatial audio content may be of spatial audio coded type, and a different, spatial audio processing function may be applied to achieve the change in perceived direction in an upward direction. In the present examples, which show the spatial audio content encoded in terms of spatial audio objects that have a location in the virtual reality space, the spatial audio modification may be considered to change the location of the spatial audio objects in the virtual reality space.

Thus, as shown in FIGS. 9 and 10, the location of amusement park audio object 810 is elevated upwards (perpendicular to the ground level 504) while its position projected onto the plane of the ground level 504 is maintained. The visual representation of the amusement park 510 may not be moved (although this may not be of any consequence since it is not visible in the bird's eye view of FIG. 6 anyway). Further, the location of bell audio object 811 is elevated upwards (perpendicular to the ground level 504) while its position projected onto the plane of the ground level 504 is maintained. The elevation of the audio objects 810, 811 has the effect of changing the direction from which the user perceives the audio when located at the point of view location 700 and provided with the bird's eye view.

In other examples, the spatial audio modification may change the position of the audio object not just in terms of their elevation (i.e. Z direction of a Cartesian coordinate system) to the ground level 504, but their position in a plane aligned at the ground level (i.e. an X and Y direction of a Cartesian coordinate system).

In the above example, the position of the audio object 812 representing the horn 512 is not changed. This is because in this example the amount of elevation applied to the spatial audio object to modify its perceived direction, or more generally the degree to which the perceived direction towards the spatial audio content is modified, is dependent on the distance between the ground location 601 and the location of the spatial audio object.

In one or more examples, the spatial audio modification is configured to provide for elevation of each of the locations of the spatial audio objects from the ground level 504 as a function of a distance of the spatial audio object location from the bird's eye view. How the distance between the spatial audio object location and the bird's eye view may be measured may vary between embodiments. For example, the distance may be measured from the ground location 601 (i.e. the point at ground level directly below the point of view location 700) or from the point of view location 700 or from an edge or point within the bird's eye view of FIG. 6 at ground level 504. FIG. 5 shows the distances 520, 521 and 522 measured between the ground location 601 and the visual representation of the spatial audio object, which corresponds to the location of the spatial audio object.

In one or more examples, the spatial audio modification may only be applied to spatial audio objects greater than a threshold distance from the bird's eye view, for example from a point within the bird's eye view including the point of view location. In this example, the spatial audio object 812 representing the horn may be less than the threshold distance away and is therefore not modified by the spatial audio modification. The threshold distance may be based on the field of view of the bird's eye view shown in FIG. 6. Thus, spatial audio objects that are located within the volume of virtual reality space visible in the bird's eye view shown in FIG. 6 may not be subject to the spatial audio modification, while those outside the field of view may be subject to the spatial audio modification.

In one or more examples, the spatial audio modification may elevate the location of the spatial audio objects to corresponding elevated spatial audio object locations, the elevated spatial audio object locations more elevated the greater the distance between the spatial audio object locations from the bird's eye view. Thus, spatial audio objects having a location close to the bird's eye view may be elevated by a first amount while spatial audio objects having a location further from the bird's eye view may be elevated by a greater second amount.

The elevation of the location of the spatial audio objects above the ground level (i.e. in the Z direction) while retaining their position in the plane of the ground level (i.e. in the X, Y directions) may advantageously widen the range of directions from which spatial audio is heard when provided with a bird's eye view. Thus, a user may be provided with an improved understanding of the location of spatial audio objects relative to the bird's eye view because they will perceive the audio as originating from a wider range of directions rather than in front of them on the ground level. Further, with the spatial audio modification being a function of distance, the further the spatial audio object the greater the elevation provided and thus the user may be provided with an appreciation of the distance they are from the spatial audio object even when they cannot see the visual content representation of it in the bird's eye view.

In one or more examples, the spatial audio modification may be such that the locations of the spatial audio object may not be elevated more than a maximum elevation threshold. In one or more examples, the maximum elevation threshold is based on the elevation of the point of view location while in other examples it may be a predetermined threshold. Thus, while it may be advantageous to elevate spatial audio objects as a function of distance from the location of the bird's eye view, having the spatial audio objects elevated higher than the point of view location 700 may not be desirable as the audio from distant spatial audio objects could be perceived as originating behind the user, relative to the user's downwardly directed bird's eye view. Thus, the spatial audio modification may be a function of distance but beyond a threshold distance the location to which the spatial audio objects are elevated is the maximum elevation threshold. In other words, the spatial audio modification may be a function of distance of the spatial audio object from a point within the current bird's eye view provided to the user as well as a function of the elevation of the point of view location 700 from the ground level 504.

As mentioned above, the spatial audio modification may only be applied to spatial audio objects outside the field of view of the bird's eye view (i.e. as shown in FIG. 6). The visual content and spatial audio objects that fall within the field of view of the bird's eye view may be dependent on rotation of the bird's eye view in terms of roll and pitch and yaw and, accordingly, the spatial audio modification may be a function of user rotation of the bird's eye view. In other examples, the range of motion available to a user presented with the bird's eye view may be limited, such as in accordance with 402 of FIG. 4.

Figure 11:
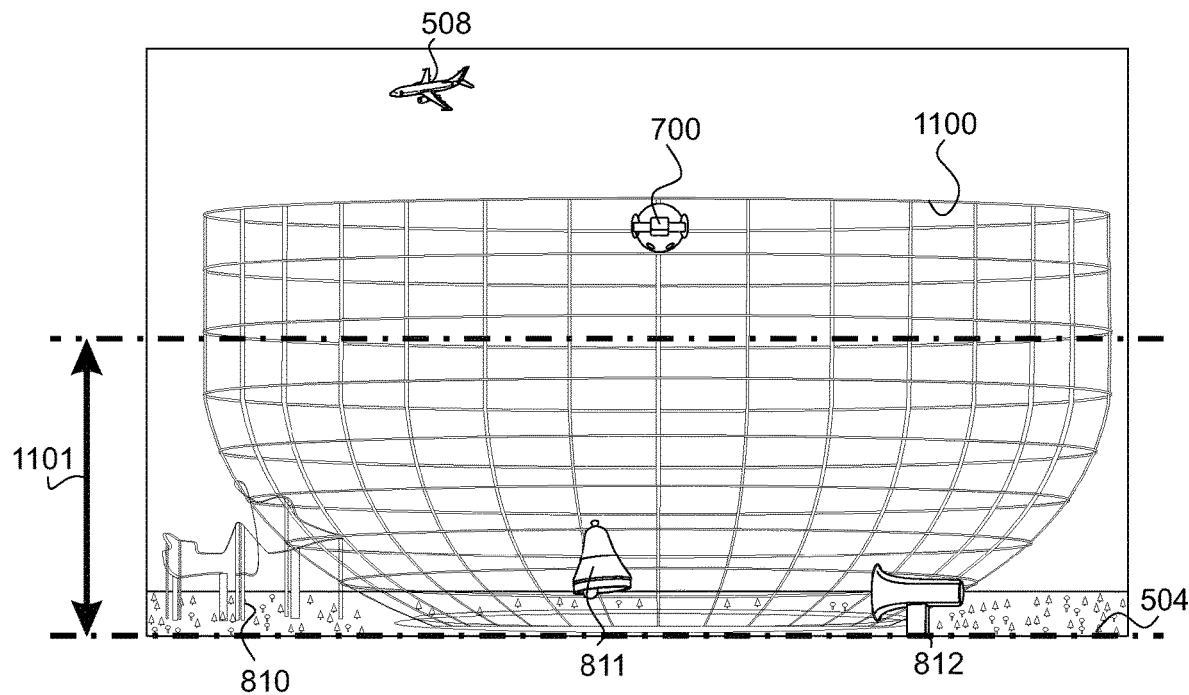
FIG. 11 shows an example function provided by the spatial audio modification.
Figure 12:
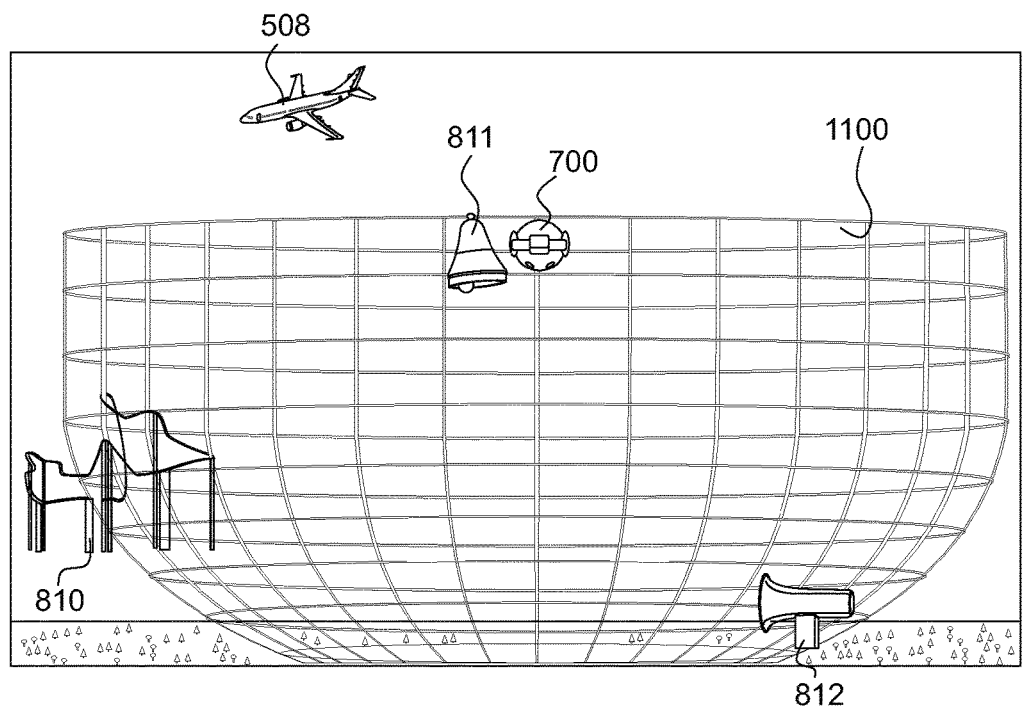
FIG. 12 shows the view of FIG. 11 rotated by 90 degrees.

Example FIGS. 11 and 12 illustrate an example spatial audio modification 1100 that is a function of distance. FIG. 11 shows the function but without the modification of the locations of the spatial audio objects. FIG. 12 shows the same view as FIG. 11 but with the locations of the spatial audio objects modified in accordance with the spatial audio modification 1100. The spatial audio modification 1100 is a function of distance that may thus be pictured as a bowl whereby spatial audio objects are elevated upwards, perpendicular to the ground level, to meet the bowl (or up to a predetermined elevation threshold limit, if met first). Accordingly, FIG. 12 shows the bell 811, the amusement park 810 and the horn 812 elevated to meet the surface of the bowl. The flat base of the bowl directly beneath the point of view location 700 illustrates the spatial audio function not being applied to spatial audio objects less that a threshold distance from the ground location within the bird's eye view or, in other examples, within the field of view of the bird's eye view.

FIG. 11 also illustrates a threshold distance 1101 from the ground level 504. The threshold distance 1101 may be used to determine which spatial audio objects are modified in terms of their elevation by the spatial audio modification. In one or more examples, the spatial audio modification is applied only to spatial audio objects having spatial audio object locations within the threshold distance 1101 of the ground level 504. Thus, in the example of FIG. 11, the audio from the spatial audio object associated with the aircraft 508 is not modified by the spatial audio modification as it is above the threshold 1101. In one or more examples, spatial audio objects not arranged within the threshold distance 1101 of the ground level 504, such as the aircraft 508, may be modified by a different spatial audio modification. For example, the location of the spatial audio object representing the aircraft may be reduced in elevation, such as to an elevation level with the point of view location 700. In other examples, a different spatial audio object location modification or no spatial audio object location modification may be made for the aircraft 508.

The presentation of spatial audio may include the presentation of audio from more distant spatial audio objects at a lower volume to those that are closer to the point of view location of the user. In one or more examples, however, the spatial audio modification may provide for modification of the volume at which the audio track of each spatial audio object is presented to the user. The modification may comprise an increase in volume dependent on the distance from a point in the bird's eye view. In one or more examples, the volume modification may provide for equalization of the volume of the spatial audio objects affected by the spatial audio modification. In other examples, the volume of one or more spatial audio objects beyond a threshold distance may be increased to a predetermined audible level or boosted by a particular factor. The particular factor may be a function of the direction of travel in the virtual space. Spatial audio objects within the threshold distance may be presented with a volume dependent on their distance from the user that is without a change in volume provided by the spatial audio modification.

Figure 13:
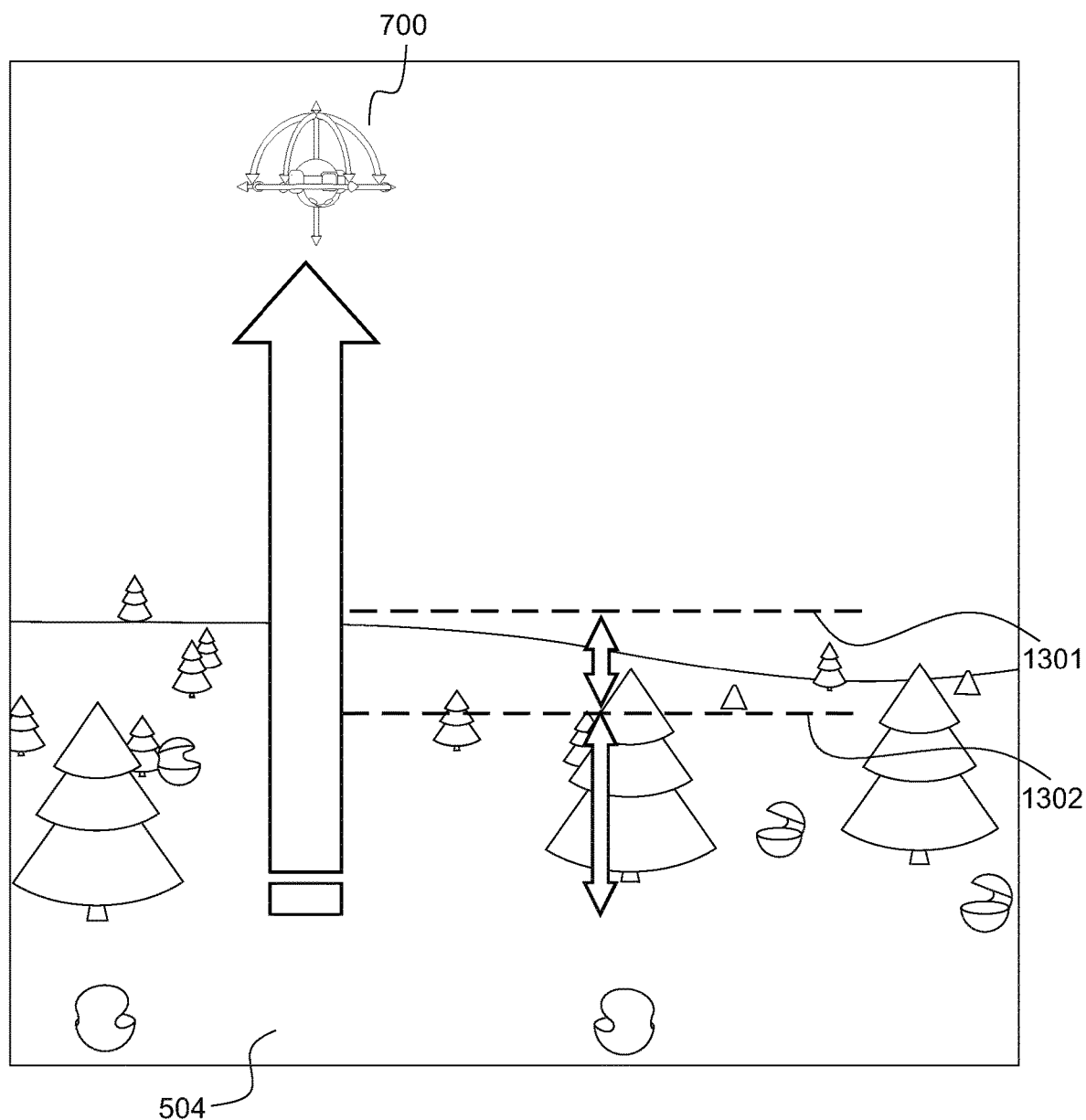
FIG. 13 shows an example of different elevation threshold from which the bird's eye view may be provided.

Example FIG. 13 shows the point of view location 700 of the bird's eye view and the ground level 504. FIG. 13 shows a plurality of different elevations of the point of view location 700. In one or more examples, the presentation of said spatial audio content with the spatial audio modification is conditional on the elevation of the point of view location 700 being above a first elevation threshold 1301. Accordingly, when a bird's eye view is provided at an elevation less than the first elevation threshold 1301, the spatial audio content may not be subject to the spatial audio modification and accordingly, the aurally perceived direction towards each of the spatial audio objects is consistent with their default location or location of the corresponding visual content.

In one or more examples, a transition region may be provided between application and non-application of the spatial audio modification. Thus, a second elevation threshold 1302 may be provided at an elevation between the ground location 504 and the first elevation threshold 1301, and wherein when the user is provided with a bird's eye view having an elevation between the second and the first elevation thresholds, the effect of the spatial audio modification may be reduced relative to when applied above the first elevation threshold. Thus, below the second elevation threshold the spatial audio modification may not be applied and above the first elevation threshold the spatial audio modification is applied. However, at an elevation of the point of view location 700 in a transition region between the second elevation threshold 1302 and first elevation threshold 1301, the change in the perceived direction towards the audio objects is reduced. As discussed above, when considering the change in perceived direction to the spatial audio in terms of spatial audio objects we can consider that the spatial audio object has been elevated. As an example, if the spatial audio modification would result in the elevation of a spatial audio object by X when the point of view location has an elevation above the first elevation threshold 1301, the elevation for a point of view location having an elevation in the transition region may be 0.5× or increase from 0× to 1× gradually across the transition region. Accordingly, as the elevation from which the bird's eye view is provided from changes, there is not an abrupt change in the directions from which the spatial audio content is perceived to be heard.

Figure 14:
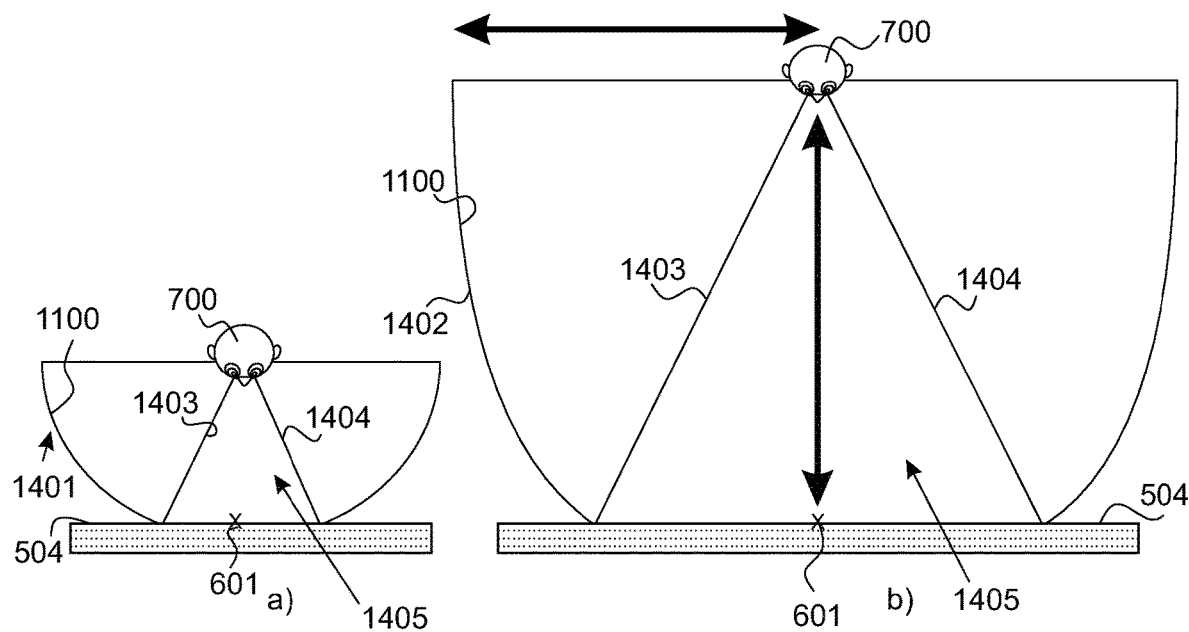
FIG. 14 shows an example of how the function that comprises the spatial audio modification may change based on elevation of the point of view location.

Example FIG. 14 illustrates how the distance between the elevated point of view location 700 and the ground location 601 (a point directly beneath the point of view location 700 at the ground level 504) may, in some embodiments affect the spatial audio modification. FIGS. 14 (a) and 14 (b) shows the spatial audio modification as a bowl function 1100 at different point of view elevations. The shape of the "bowl" may have steeper walls 1401 vs. 1402 the higher the elevation of the point of view location 700 of the bird's eye view. Put another way the degree to which an elevation is applied to a spatial audio object having a given distance from the bird's eye view may, in some examples, be greater the greater the elevation of the point of view location 700 from the ground location 601.

FIG. 13 illustrated the concept of not applying the spatial audio modification if the elevation of the point of view location was below a threshold elevation 1301, 1302. In the example of FIG. 14, on the other hand, the spatial audio modification may comprise a continuous processing that is in some embodiments applied even when the point of view location 700 is on the ground level 504. Thus, as the user reaches the ground level 504, the "bowl" shape of the function that defines the spatial audio modification may become flatter. Extrapolating from FIG. 14a to lower point of view elevations, the "bowl" may become shaped more like a "saucer" when the user reaches the ground level. Thus, no or an insignificant spatial audio modification would be applied to audio sources within the "saucer" area, while at least some modification could be applied to audio sources farther away.

With reference to FIG. 14 its will be appreciated that the lines 1403 and 1404 illustrate the field of view of the bird's eye view. In one or more examples, spatial audio objects having a location in said field of view, i.e. in region 1405, when unmodified by the spatial audio modification may not be subject to modification by the spatial audio modification. Accordingly, for spatial audio objects that may correspond to a visual feature in the visual content, when the visual feature is visible in the field of view, the spatial audio is unmodified so that it is perceived to be heard from a direction corresponding to the visual content. Accordingly, based on a change in the field of view of the bird's eye view such that an unmodified location of a spatial audio object that is currently subject to the spatial audio modification enters said field of view, provide for removal of the spatial audio modification from said spatial audio object that has now entered said field of view. Thus, as the visual content corresponding to spatial audio objects becomes visible to a user in their bird's eye view, the spatial audio objects may be substantially realigned with the visual content with which they are associated. Accordingly, as an example, assuming that the visual imagery of the bell 511 enters the field of view of the bird's eye view, the apparatus may provide for the spatial audio object of the bell 811 to be substantially aligned with the visual imagery 511 by way of removal of any spatial audio modification that may have been applied while the bell 511 was outside the field of view of the bird's eye view.

Figure 15:
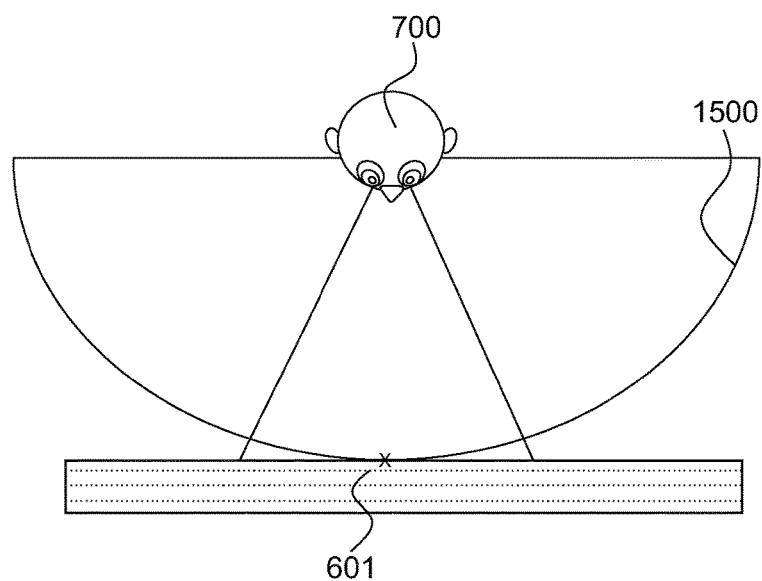
FIG. 15 shows an example of providing the spatial audio modification to spatial audio within the field of view.

While in some embodiments the spatial audio modification is removed when the unmodified location of the spatial audio object is within the field of view, example FIG. 15 shows an alternative embodiment. In FIG. 15, the elevation of spatial audio objects may be unmodified by the spatial audio modification when their location is at the ground location 601. However, the spatial audio modification may comprise a function that provides progressively greater increases in elevation for spatial audio objects with increasing distance from the ground location 601. Thus, the bowl 1500 representing the function of the spatial audio modification may have a round-bottomed appearance.

While the apparatus 101 may, in some embodiments, apply the spatial audio modification to spatial audio objects within the field of view (as in FIG. 15) and may, in other embodiments, not apply the spatial audio modification to spatial audio objects within the field of view (as in FIGS. 14a and b), these embodiments may be combined. In one or more examples, the apparatus may be configured to apply the spatial audio modification to spatial audio objects having an (unmodified) location within the field of view when the elevation of the point of view location 700 is above an in-view-modification elevation threshold and, when the point of view location 700 is below an in-view-modification elevation threshold, the apparatus may be configured to apply the spatial audio modification only to spatial audio objects having a location that is outside the field of view of said birds-eye view. Thus, the in-view-modification elevation threshold may allow for a spatial audio modification to occur for audio objects that are in view provided that the elevation of the point of view location 700 is above the in-view-modification elevation threshold.

Figure 16:
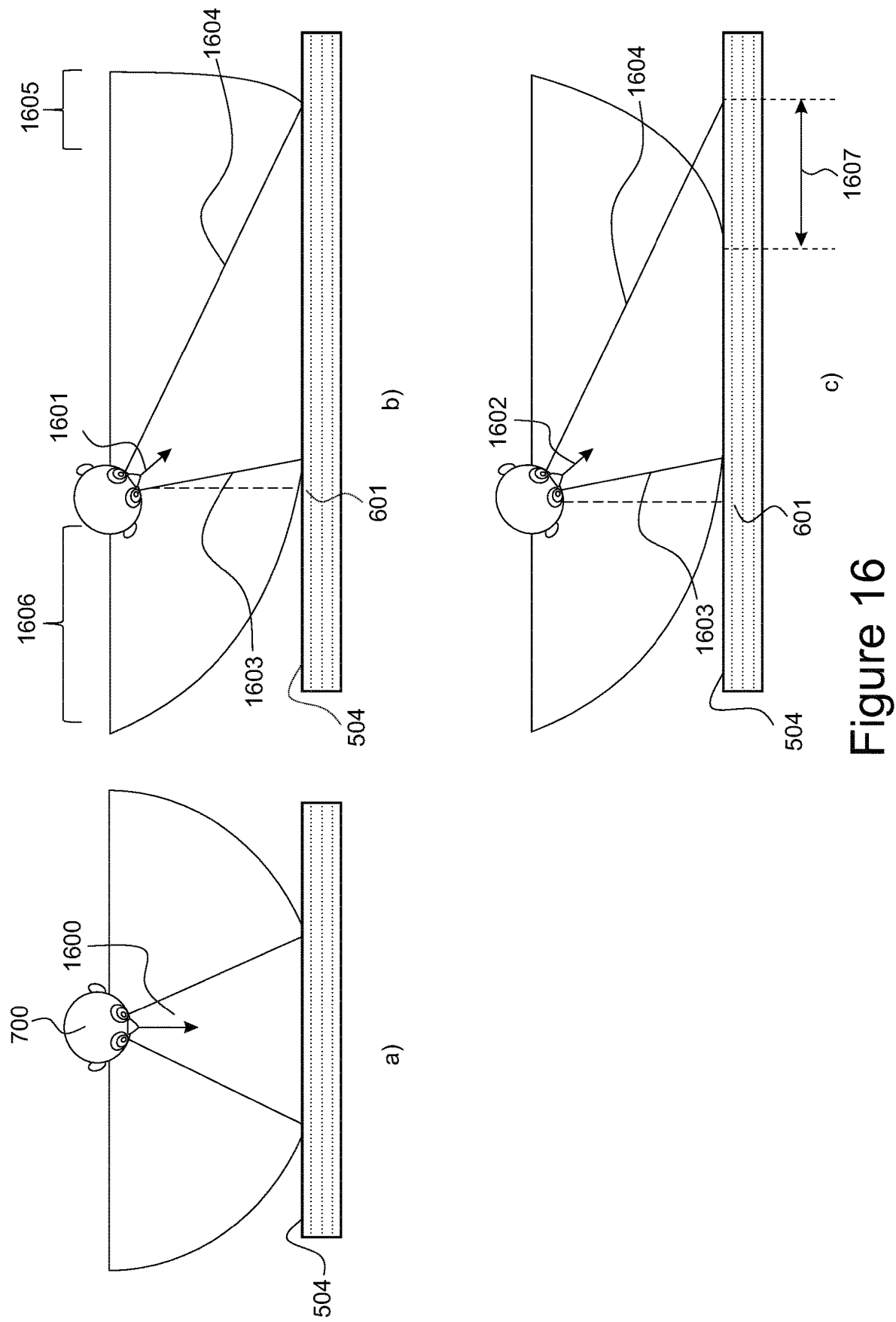
FIG. 16 shows an example of how the function that comprises the spatial audio modification may change based on deviation of direction of view from the point of view location deviating from substantially downwards towards the ground level.

Example FIG. 16 illustrates the spatial audio modification that may be applied based on rotation of the viewing direction of the bird's eye view from a directly down direction to a direction oblique to the ground level 504.

FIG. 16(a) shows the shape of the spatial audio modification function that may be applied when the viewing direction 1600 is directly downwards towards and perpendicular to the ground level. The function is substantially symmetrical in relation to the elevation provided to spatial audio objects based on their distance from the ground location on opposed sides of the field of view. FIG. 16(b) shows a first example of the spatial audio modification function that may be applied when the viewing direction 1601 is oblique to the ground level 504. FIG. 16(c) shows a second example of the spatial audio modification function that may be applied when the viewing direction 1602 is oblique to the ground level 504.

The example of FIG. 16(b) is similar to previous examples in which any spatial audio objects that fall within the field of view, shown by lines 1603, 1604 are not subject to the spatial audio modification function, while those outside the field of view are elevated in accordance with the spatial audio modification. As shown in FIG. 16(b) based on provision of a bird's eye view with a viewing direction oblique to the ground level 504, the spatial audio modification may be asymmetric in relation to the elevation provided to spatial audio objects based on their distance from the ground location on opposed sides of the field of view. Accordingly, in one or more examples, spatial audio objects beyond a side of the field of view 1604 having a location further from the ground location 601 may be elevated by the spatial audio modification at a greater rate with respect to distance (i.e. region 1605) than spatial audio objects beyond a side of the field of view 1603 having a location closer to the ground location (i.e. region 1606).

The example of FIG. 16(c) shows a similar arrangement in which the spatial audio modification comprises an asymmetric function with respect to distance from the ground location 601. However, in FIG. 16(c) the spatial audio modification is applied to spatial audio objects that have a location within the field of view 1603, 1604 at least with a predetermined distance 1607 of an edge 1604 of the field of view that is further from the ground location 601 than an opposite edge 1603.

The choice of whether to apply the spatial audio modification to a spatial audio object may be taken based on various different factors. For example, it may be chosen by the VR content creator that some spatial audio objects should not be subject to the spatial audio modification. In one or more examples, the proximity of visual content with which the spatial audio object is associated to the user may be a deciding factor. In one or more examples, whether or not it is possible for the user to interact with the visual object associated with the spatial audio object or the spatial audio object itself may be a deciding factor.

In general, the application of the spatial audio modification to spatial audio objects may be dependent on a category assigned to said spatial audio modification. The category may be assigned by the content creator or it may be assigned at playback of the VR content based on the ability to interact with the object, user preferences or any other factor. In other examples, the category may define whether the spatial audio object is a point of interest or not and the spatial audio modification may be applied or not applied based on such a category. In one or more examples, the category defines whether or not the user is within a predetermined interaction distance of the spatial audio object or the point or region of visual content associated therewith. If the user is within the interaction distance it may be preferable to not apply the spatial audio modification while if the user is beyond the interaction distance the spatial audio modification may be applied.

In one or more embodiments, the apparatus may be configured to apply different spatial audio modifications (such as different functions in terms of applied elevation and/or volume changes) based on the category of the spatial audio object.

Figure 17:
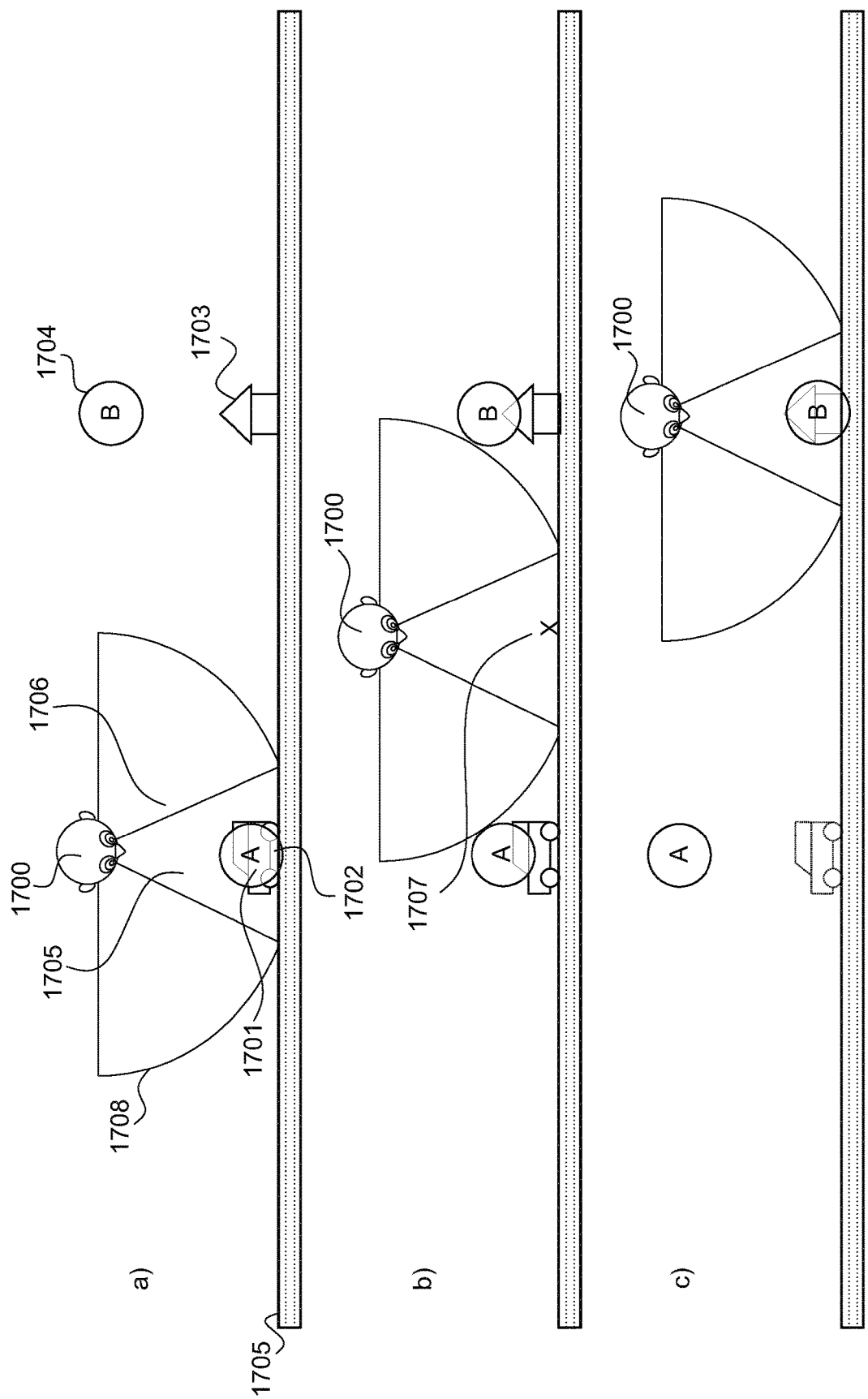
FIG. 17 shows an example of translation of the bird's eye view and the effect on spatial audio objects.

The example FIG. 17, in parts (a), (b) and (c), presents an example of the user movement causing lateral movement of the bird's eye view. This is analogous to moving on a map. FIG. 17 shows the user having a point of view location 1700, depicted by the user's head looking downwards, elevated above and looking towards the ground level 1705 thus providing the user with a bird's eye view. The point of view location is shown, over the three parts (a), (b) and (c) translating to the right as shown in the figure. In the figure, a first visual object 1701 is shown comprising a car. The visual object may be part of the imagery of the visual content or may comprise a three-dimensional model present in the virtual reality space. The audio of the car is represented by a spatial audio object 1702, shown as a circle with the letter "A" therein. A second visual object 1703 is shown comprising a house. The audio of the house is represented by a spatial audio object 1704, shown as a circle with the letter "B" therein. Without the spatial audio modification, the default location for the spatial audio objects 1701, 1703 is to correspond to the location of their associated visual objects. It will be appreciated that in one or more examples a spatial audio object may not have a visual representation and therefore, more generally, a spatial audio object may be considered to have a default location in the virtual reality space.

In part (a), the first visual object 1701 corresponding to the first spatial audio object 1701 is shown within the field of view 1705, 1706. Accordingly, in this example, the spatial audio modification is not applied to the first spatial audio object 1702 and it is thus presented such that the audio is perceived from its default location, aligned with the visual object of the car 1701. The second visual object 1703 corresponding to the second spatial audio object 1704 is shown outside the field of view 1705, 1706. Accordingly, in this example, the spatial audio modification is applied to the second spatial audio object 1704 and it is thus presented such that the audio is perceived from a direction corresponding to a location elevated from the second visual object 1703. Thus, the perceived direction towards the second spatial audio object 1704 is heard from a more upwards direction away from the ground level 504.

In this example, the spatial audio modification is a function of distance of the spatial audio object from the ground location 1707. The function is illustrated by the bowl 1708. Further, in this embodiment, the maximum elevation threshold comprises the elevation of the point of view location 1700. The second spatial audio object 1704 is shown beyond a threshold distance from the bird's eye view, represented in this example by the edges of the bowl 1708, and is thus elevated to the maximum elevation threshold.

Part (b) shows the point of view location 1700 translated to a position between the first visual object 1701 and the second visual object 1703 and both of them are outside the field of view 1705, 1706. In such a position, both the first and second spatial audio objects 1702, 1704 are subject to the spatial audio modification, which provides for their elevation in accordance with the function 1708 based on their distance from the ground location 1707.

Part (c) shows the point of view location 1700 translated further to the right such that the second visual object 1703 is within the field of view 1705, 1706 while the first visual object 1701 is outside. In such a position, the first spatial audio object is subject to the spatial audio modification and is thus elevated to the maximum elevation threshold. The second spatial audio objects 1704, being within the field of view is not subject to the spatial audio modification and is thus located at its default location, aligned with the second visual object 1703.

In summary of the effect of FIG. 17, the apparatus 101 may be caused, based on translational movement of the bird's eye view, to provide for one or more of application of, application of to a different degree and removal of the spatial audio modification to one or more spatial audio objects in accordance with one or more of:
  i) the movement of a default location of each of the one or more spatial audio objects into or out of the field of view of the bird's eye view;
  ii) the movement of a default location of each of the one or more spatial audio objects through a threshold distance used to control the application or non-application of the spatial audio modification;
  iii) a change in distance between the default location of each of the one or more spatial audio objects and a point within the current bird's eye view.

Figure 18:
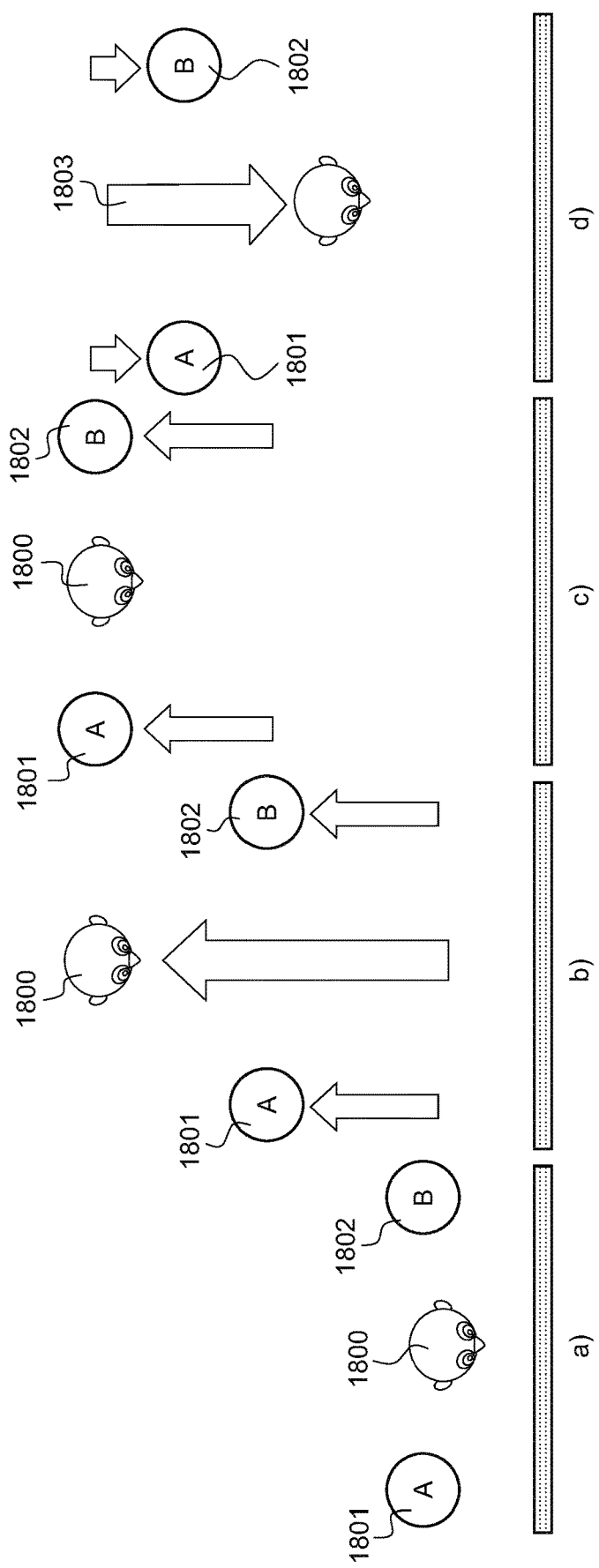
FIG. 18 shows an example of application of the spatial audio modification in response to abrupt changes in the elevation of the bird's eye view.

The example FIG. 18 illustrates an example embodiment of how the apparatus 101 may deal with changes in elevation of the point of view location.

Parts (a), (b) and (c) illustrate a change in elevation of the point of view location 1800 of the bird's eye view. Two spatial audio objects 1801, 1802 are shown. At the first elevation shown in part (a) the spatial audio objects are at a height that is level with the point of view location 1800. However, in part (b) the point of view location is changed, such as at a rate above a threshold rate comprising a rate-of-change-in-elevation threshold. Providing an abrupt change in the location of the spatial audio objects in accordance with the modification indicated by the spatial audio modification may be confusing to a user. Accordingly, the elevation of the spatial audio objects to reach the elevation indicated by the spatial audio modification is gradually applied over a gradual-application time. Thus, while the change in elevation of the point of view location is provided over the time between parts (a) and (b). The modified location of the spatial audio object in accordance with the spatial audio modification is not reached until a later time shown in part (c). Accordingly, the time between part (a) and part (c) may represent the gradual-application time while the time between part (a) and part (b) represent the time over which the change in elevation occurred.

Part (d) shows the elevation of the point of view location decreasing, shown by arrow 1803. As with the increase in elevation of the point of view location 1800, the spatial audio modification may be applied gradually based on a decrease in elevation.

FIG. 19 shows a flow diagram illustrating the steps of,
  based on 1900 virtual reality content for viewing in virtual reality, the virtual reality content comprising visual content for display in a three dimensional virtual reality space and spatial audio content comprising audio for presentation such that it is audibly perceived to originate from one or more particular directions in the virtual reality space corresponding to one or more points or regions in the visual imagery, the virtual reality content defining at least a ground level of said virtual reality space; and based on display of a birds-eye view of the virtual reality space to a user comprising a view of the visual imagery substantially downward towards said ground level from a point of view location in said virtual reality space elevated from a ground location at said ground level;
  providing 1901 for presentation of said spatial audio content with a spatial audio modification, the spatial audio modification configured to modify the particular direction from which the user perceives the spatial audio as being heard in an upward direction relative to said ground level at least for spatial audio content having a particular direction that is outside a field of view of said birds-eye view.

FIG. 20 illustrates schematically a computer/processor readable medium 2000 providing a program according to an example. In this example, the computer/processor readable medium is a disc such as a digital versatile disc (DVD) or a compact disc (CD). In some examples, the computer readable medium may be any medium that has been programmed in such a way as to carry out an inventive function. The computer program code may be distributed between the multiple memories of the same type, or multiple memories of a different type, such as ROM, RAM, flash, hard disk, solid state, etc.

User inputs may be gestures which comprise one or more of a tap, a swipe, a slide, a press, a hold, a rotate gesture, a static hover gesture proximal to the user interface of the device, a moving hover gesture proximal to the device, bending at least part of the device, squeezing at least part of the device, a multi-finger gesture, tilting the device, or flipping a control device. User inputs may provide for changing to or from the bird's eye view, rotating or translating the bird's eye view or changing elevation of the point of view location. Further the gestures may be any free space user gesture using the user's body, such as their arms, or a stylus or other element suitable for performing free space user gestures.

The apparatus shown in the above examples may be a portable electronic device, a laptop computer, a mobile phone, a Smartphone, a tablet computer, a personal digital assistant, a digital camera, a smartwatch, smart eyewear, a pen based computer, a non-portable electronic device, a desktop computer, a monitor, a smart TV, a server, a wearable apparatus, a virtual reality apparatus, or a module/circuitry for one or more of the same.

Any mentioned apparatus and/or other features of particular mentioned apparatus may be provided by apparatus arranged such that they become configured to carry out the desired operations only when enabled, e.g. switched on, or the like. In such cases, they may not necessarily have the appropriate software loaded into the active memory in the non-enabled (e.g. switched off state) and only load the appropriate software in the enabled (e.g. on state). The apparatus may comprise hardware circuitry and/or firmware. The apparatus may comprise software loaded onto memory. Such software/computer programs may be recorded on the same memory/processor/functional units and/or on one or more memories/processors/functional units.

In some examples, a particular mentioned apparatus may be pre-programmed with the appropriate software to carry out desired operations, and wherein the appropriate software can be enabled for use by a user downloading a "key", for example, to unlock/enable the software and its associated functionality. Advantages associated with such examples can include a reduced requirement to download data when further functionality is required for a device, and this can be useful in examples where a device is perceived to have sufficient capacity to store such pre-programmed software for functionality that may not be enabled by a user.

Any mentioned apparatus/circuitry/elements/processor may have other functions in addition to the mentioned functions, and that these functions may be performed by the same apparatus/circuitry/elements/processor. One or more disclosed aspects may encompass the electronic distribution of associated computer programs and computer programs (which may be source/transport encoded) recorded on an appropriate carrier (e.g. memory, signal).

Any "computer" described herein can comprise a collection of one or more individual processors/processing elements that may or may not be located on the same circuit board, or the same region/position of a circuit board or even the same device. In some examples one or more of any mentioned processors may be distributed over a plurality of devices. The same or different processor/processing elements may perform one or more functions described herein.

The term "signalling" may refer to one or more signals transmitted as a series of transmitted and/or received electrical/optical signals. The series of signals may comprise one, two, three, four or even more individual signal components or distinct signals to make up said signalling. Some or all of these individual signals may be transmitted/received by wireless or wired communication simultaneously, in sequence, and/or such that they temporally overlap one another.

With reference to any discussion of any mentioned computer and/or processor and memory (e.g. including ROM, CD-ROM etc.), these may comprise a computer processor, Application Specific Integrated Circuit (ASIC), field-programmable gate array (FPGA), and/or other hardware components that have been programmed in such a way to carry out the inventive function.

The applicant hereby discloses in isolation each individual feature described herein and any combination of two or more such features, to the extent that such features or combinations are capable of being carried out based on the present specification as a whole, in the light of the common general knowledge of a person skilled in the art, irrespective of whether such features or combinations of features solve any problems disclosed herein, and without limitation to the scope of the claims. The applicant indicates that the disclosed aspects/examples may consist of any such individual feature or combination of features. In view of the foregoing description it will be evident to a person skilled in the art that various modifications may be made within the scope of the disclosure.

While there have been shown and described and pointed out fundamental novel features as applied to examples thereof, it will be understood that various omissions and substitutions and changes in the form and details of the devices and methods described may be made by those skilled in the art without departing from the scope of the disclosure. For example, it is expressly intended that all combinations of those elements and/or method steps which perform substantially the same function in substantially the same way to achieve the same results are within the scope of the disclosure. Moreover, it should be recognized that structures and/or elements and/or method steps shown and/or described in connection with any disclosed form or examples may be incorporated in any other disclosed or described or suggested form or example as a general matter of design choice. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

The invention claimed is:

1. An apparatus comprising:
   at least one processor; and
   at least one memory including computer program code,
   the at least one memory and the computer program code configured to, with the at least one processor, cause the apparatus to perform at least the following:
   receive a virtual reality content comprising: (1) a visual content configured for display in a virtual reality space; and (2) a spatial audio content configured for a presentation that is audibly perceived by a user to originate from one or more directions in the virtual reality space, wherein the one or more directions correspond to at least one or more regions in the visual content relative to a point of view location, wherein the virtual reality content defines at least a ground level of the virtual reality space with the one or more directions from which the user audibly perceives the spatial audio content to originate being substantially in a plane corresponding to the ground level;

generate a display of a bird's-eye view of the virtual reality space comprising a view of the visual content downward towards the ground level from the point of view location, wherein the point of view location in the virtual reality space is elevated above the ground level; and render, based on the display of the bird's-eye view and the virtual reality content, a presentation of the spatial audio content with a spatial audio modification configured to modify the one or more directions from which the user perceives the spatial audio content as being heard, wherein the spatial audio modification causes the spatial audio content to be heard from an upward direction relative to the ground level, wherein the spatial audio content is at least partially associated with a direction that is outside a field of view of the bird's-eye view.

2. The apparatus according to claim 1, wherein the spatial audio content is defined by one or more spatial audio objects having an audio track associated therewith and a spatial audio object location in the virtual reality space, the spatial audio object location comprising a location of the one or more regions from which the audio track is perceived to originate when presented to the user relative to the point of view location of the user in the virtual reality space, and wherein the spatial audio modification is configured to modify the one or more spatial audio objects by providing for elevation of the spatial audio object locations from the ground level to thereby provide the modification of the direction from which the user perceives the audio of the audio track of the one or more spatial audio objects as being heard in the upward direction relative to the ground level.

3. The apparatus according to claim 2, wherein the spatial audio modification is configured to provide for an elevation of one or more of the spatial audio object locations from the ground level to elevated spatial audio object locations as a function of a distance of the spatial audio object location from the bird's-eye view.

4. The apparatus according to claim 3, wherein the function is configured to elevate the spatial audio object locations to corresponding elevated spatial audio object locations, the elevated spatial audio object locations more elevated the greater the distance of the spatial audio object location from the bird's-eye view.

5. The apparatus according to claim 3, wherein the function is configured to elevate the spatial audio object locations to corresponding elevated spatial audio object locations, the elevated spatial audio object locations having no more than a maximum elevation threshold, the maximum elevation threshold based on the elevation of the point of view location.

6. The apparatus according to claim 2, wherein the spatial audio modification is applied to the one or more spatial audio objects having spatial audio object locations within a threshold distance of the ground level.

7. The apparatus according to claim 2, wherein the spatial audio modification is further configured to modify a volume at which the audio track of the one or more spatial audio objects are presented to the user.

8. The apparatus according to claim 1, wherein the presentation of the spatial audio content with the spatial audio modification is conditional on an elevation of the point of view location associated with a first elevation threshold.

9. The apparatus according to claim 8, wherein when the elevation of the point of view location is below an in-view-modification threshold, the spatial audio modification is applied to spatial audio content having a direction that is outside the field of view of the bird's-eye view; and when the elevation of the point of view location is above the in-view-modification threshold, the spatial audio modification is applied to spatial audio content having a direction that is within and outside the field of view of the bird's-eye view.

10. The apparatus according to claim 1, wherein based on movement of the bird's-eye view to a different field of view and thereby include, at least in part, a different part of the visual content, the apparatus is caused to provide for removal of the spatial audio modification at least for spatial audio content having a direction that is within the different field of view of the bird's-eye view.

11. The apparatus according to claim 6, wherein the application of the spatial audio modification to the one or more spatial audio objects is dependent on a category assigned to the spatial audio objects.

12. The apparatus according to claim 1, wherein based on one or both of a change in elevation of the bird's: eye view and a change from a view provided at the ground level to a bird's-eye view at a higher elevation, provide for gradual application of the spatial audio modification over a gradual-application time greater than the time to complete the change.

13. The apparatus according to claim 1, wherein the virtual reality content comprises one or more degrees of freedom.

14. A method comprising:

receiving a virtual reality content comprising: (1) a visual content configured for display in a virtual reality space; and (2) a spatial audio content configured for a presentation that is audibly perceived by a user to originate from one or more directions in the virtual reality space, wherein the one or more directions correspond to at least one or more regions in the visual content relative to a point of view location, wherein the virtual reality content defines at least a ground level of the virtual reality space with the one or more directions from which the user audibly perceives the spatial audio content to originate being substantially in a plane corresponding to the ground level;

generating a display of a bird's-eye view of the virtual reality space comprising a view of the visual content downward towards the ground level from the point of view location, wherein the point of view location in the virtual reality space is elevated above the ground level; and rendering, based on the display of the bird's-eye view and the virtual reality content, a presentation of the spatial audio content with a spatial audio modification configured to modify the one or more directions from which the user perceives the spatial audio content as being heard, wherein the spatial audio modification causes the spatial audio content to be heard from an upward direction relative to the ground level, wherein the spatial audio content is at least partially associated with a direction that is outside a field of view of the bird's-eye view.

15. The method according to claim 14, wherein the spatial audio content is defined by one or more spatial audio objects having an audio track associated therewith and a spatial audio object location in the virtual reality space, the spatial audio object location comprising a location of the one or more regions from which the audio track is perceived to originate when presented to the user relative to the point of view location of the user in the virtual reality space, and wherein the spatial audio modification is configured to modify the one or more spatial audio objects by providing for elevation of the spatial audio object locations from the ground level to thereby provide the modification of the direction from which the user perceives the audio of the audio track of the one or more spatial audio objects as being heard in the upward direction relative to the ground level.

16. The method according to claim 15, wherein the spatial audio modification is configured to provide for an elevation of one or more of the spatial audio object locations from the ground level to elevated spatial audio object locations as a function of a distance of the spatial audio object location from the bird's-eye view.

17. The method according to claim 16, wherein the function is configured to elevate the spatial audio object locations to corresponding elevated spatial audio object locations, the elevated spatial audio object locations more elevated the greater the distance of the spatial audio object location from the bird's-eye view.

18. The method according to claim 16, wherein the function is configured to elevate the spatial audio object locations to corresponding elevated spatial audio object locations, the elevated spatial audio object locations having no more than a maximum elevation threshold, the maximum elevation threshold based on the elevation of the point of view location.

19. The method according to claim 15, wherein the spatial audio modification is applied to the one or more spatial audio objects having spatial audio object locations within a threshold distance of the ground level.

20. A non-transitory computer readable medium comprising program instructions stored thereon for performing at least the following:
receive a virtual reality content comprising: (1) a visual content configured for display in a virtual reality space; and (2) a spatial audio content configured for a presentation that is audibly perceived by a user to originate from one or more directions in the virtual reality space, wherein the one or more directions correspond to at least one or more regions in the visual content relative to a point of view location, wherein the virtual reality content defines at least a ground level of the virtual reality space with the one or more directions from which the user audibly perceives the spatial audio content to originate being substantially in a plane corresponding to the ground level;
generate a display of a bird's-eye view of the virtual reality space comprising a view of the visual content downward towards the ground level from the point of view location, wherein the point of view location in the virtual reality space is elevated above the ground level; and
render, based on the display of the bird's-eye view and the virtual reality content, a presentation of the spatial audio content with a spatial audio modification configured to modify the one or more directions from which the user perceives the spatial audio content as being heard, wherein the spatial audio modification causes the spatial audio content to be heard from an upward direction relative to the ground level, wherein the spatial audio content is at least partially associated with a direction that is outside a field of view of the bird's-eye view.

* * * * *

UNITED STATES PATENT AND TRADEMARK OFFICE
CERTIFICATE OF CORRECTION

PATENT NO. : 11,076,253 B2
APPLICATION NO. : 16/754004
DATED : July 27, 2021
INVENTOR(S) : Laaksonen et al.

It is certified that error appears in the above-identified patent and that said Letters Patent is hereby corrected as shown below:

In the Claims

Column 26,
Line 24, "bird's: eye view" should read --bird's-eye view--.

Signed and Sealed this
Twenty-eighth Day of June, 2022

Katherine Kelly Vidal
*Director of the United States Patent and Trademark Office*